US010767676B2

(12) United States Patent
Cattaneo

(10) Patent No.: US 10,767,676 B2
(45) Date of Patent: Sep. 8, 2020

(54) HIDDEN JOINING DEVICE FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

(\*) Notice: Subject to any disclaimer, the term of this patent is extended or adjusted under 35 U.S.C. 154(b) by 383 days.

(21) Appl. No.: 15/751,224

(22) PCT Filed: Sep. 13, 2016

(86) PCT No.: PCT/EP2016/071566
§ 371 (c)(1),
(2) Date: Feb. 8, 2018

(87) PCT Pub. No.: WO2017/046087
PCT Pub. Date: Mar. 23, 2017

(65) Prior Publication Data
US 2018/0245618 A1    Aug. 30, 2018

(30) Foreign Application Priority Data

Sep. 16, 2015  (IT) .................. 102015000052152

(51) Int. Cl.
*F16B 12/20* (2006.01)
*A47B 96/06* (2006.01)
*F16B 12/46* (2006.01)

(52) U.S. Cl.
CPC ........ *F16B 12/2063* (2013.01); *A47B 96/066* (2013.01); *F16B 12/46* (2013.01)

(58) Field of Classification Search
CPC .... F16B 7/0466; F16B 12/2063; F16B 12/18; F16B 12/20; F16B 12/2009; F16B 12/24
See application file for complete search history.

(56) References Cited

U.S. PATENT DOCUMENTS

| 3,132,557 A * | 5/1964 | Bauer .................. F16B 21/18 411/511 |
| 3,672,710 A * | 6/1972 | Kroopp ................ E04B 1/5831 403/252 |
| 3,730,568 A * | 5/1973 | Giovannetti ........ F16B 12/2036 403/245 |
| 3,810,341 A * | 5/1974 | Holz .................... F16B 12/24 403/292 |

(Continued)

FOREIGN PATENT DOCUMENTS

| EP | 2705775 | 3/2014 |
| WO | 2009094720 | 8/2009 |

*Primary Examiner* — Daniel J Wiley
(74) *Attorney, Agent, or Firm* — Themis Law

(57) ABSTRACT

A hidden joining device for parts of furniture and furnishing items, in particular between a first panel, such as a shoulder of a piece of furniture, and a second panel, such as a base or shelf or top of a piece of furniture, which must be moved toward each other along an approach direction to bring the edge of one panel abutted in a tightening position against a surface of the other panel, includes a blocking group and a connection group coupled to those panels The blocking group is inserted inside a seat that is contained in the thickness of the panel on which the blocking group is applied. The seat has an axis perpendicular to the approach direction and extends from a rear edge of the panels toward the interior of the panels, forming a single visible hole in the two panels when connected.

18 Claims, 18 Drawing Sheets

(56) References Cited

U.S. PATENT DOCUMENTS

| | | | | |
|---|---|---|---|---|
| 4,116,573 | A * | 9/1978 | Fuchs | F16B 5/0607 |
| | | | | 403/264 |
| 4,334,797 | A * | 6/1982 | Wahlin | E04B 1/58 |
| | | | | 403/252 |
| 4,641,983 | A * | 2/1987 | Strassle | E04B 2/766 |
| | | | | 403/12 |
| 4,893,959 | A * | 1/1990 | Offenbroich | F16B 5/0088 |
| | | | | 403/12 |
| 5,209,598 | A * | 5/1993 | Zullig | F16B 7/0466 |
| | | | | 403/255 |
| 5,375,923 | A * | 12/1994 | Hall | A47B 88/956 |
| | | | | 312/330.1 |
| 6,960,045 | B2 * | 11/2005 | Schmalzhofer | F16B 7/187 |
| | | | | 403/252 |
| 8,528,188 | B2 * | 9/2013 | Vestergaard-Jensen | |
| | | | | F16B 12/18 |
| | | | | 29/525.01 |
| 2010/0322740 | A1 | 12/2010 | Vestergaard-Jensen | |

* cited by examiner

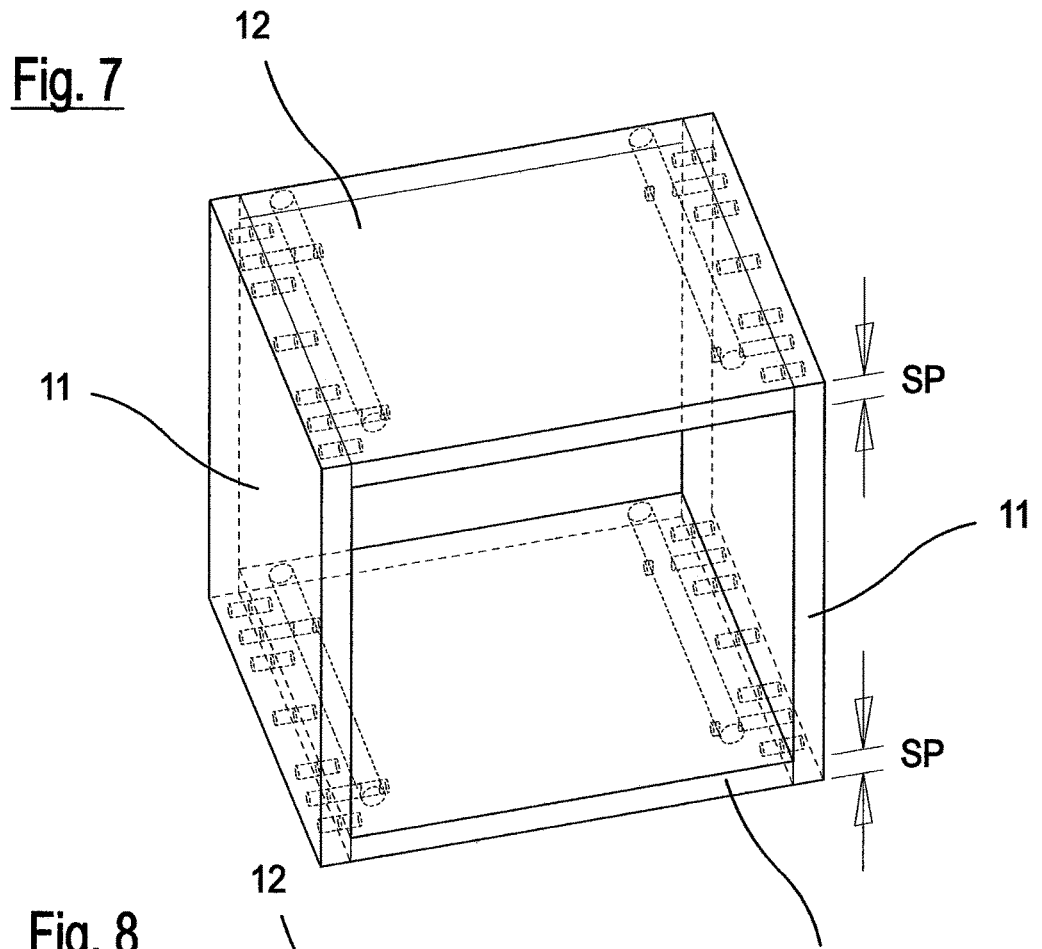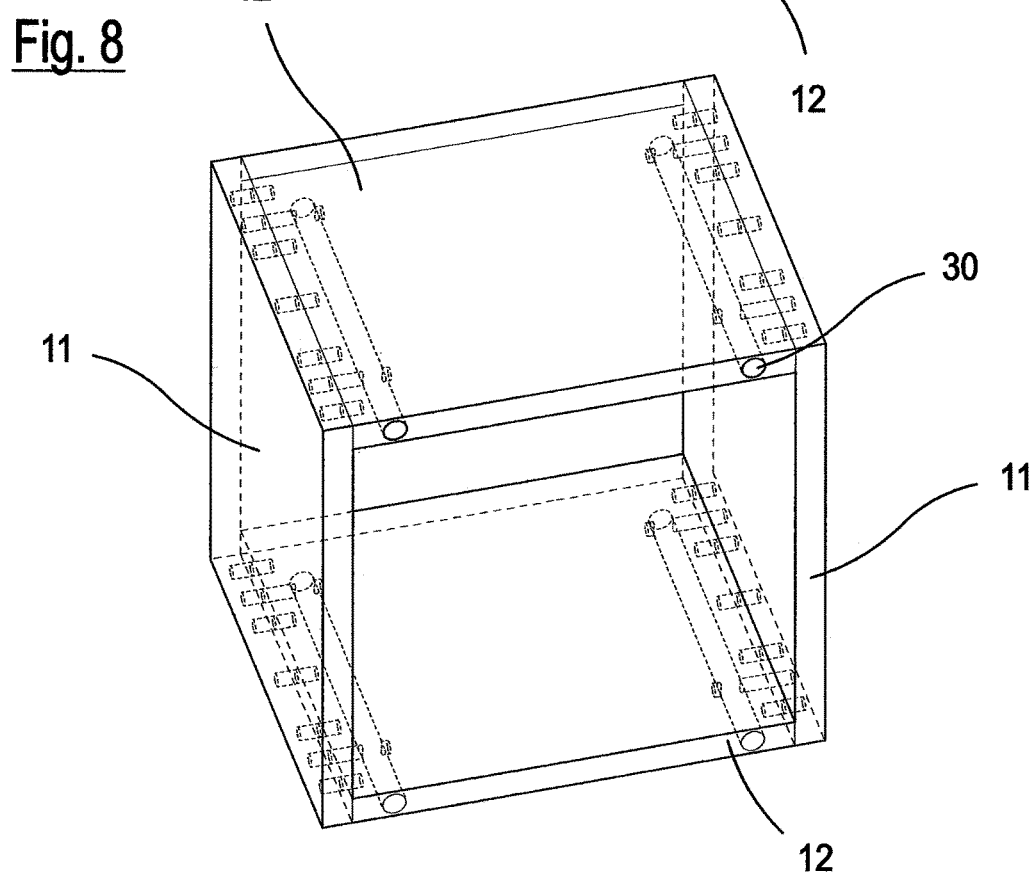

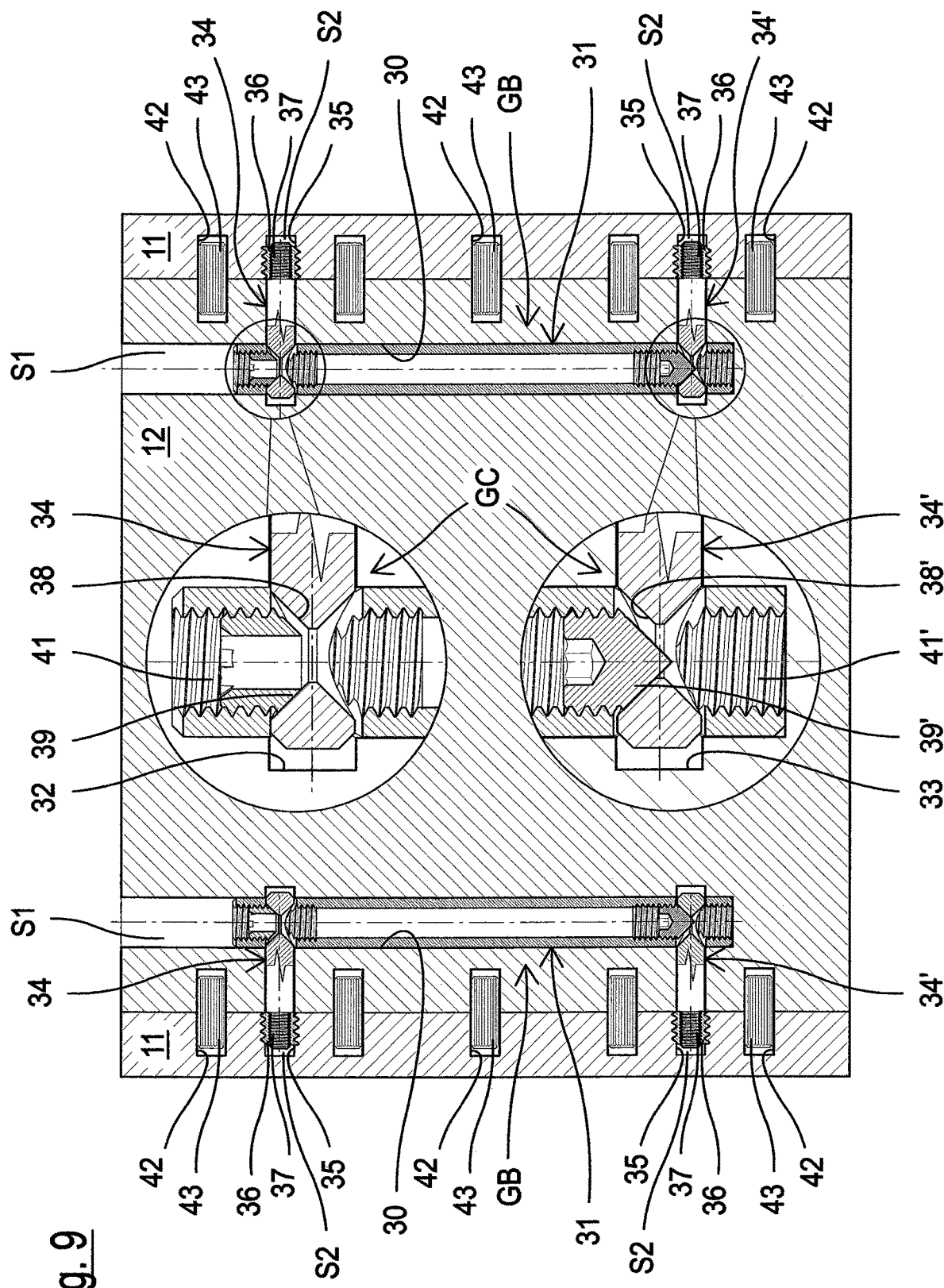

HIDDEN JOINING DEVICE FOR PARTS OF FURNITURE AND FURNISHING ITEMS

The present invention relates to a hidden joining device for parts of furniture and furnishing items.

The joining between two panels, for example between a shoulder of a piece of furniture and a base, or in any case a shelf, is currently effected in the furniture and furnishing field using various procedures and with different solutions.

Examples of these solutions are known from patents U.S. Pat. Nos. 7,494,297, 5,567,081, 6,547,477 and 4,408,923.

These known technical solutions have a certain complexity and in any case have a certain visibility, as they require closing elements of the seats or holes necessary for positioning the elements that effect the joining.

In this respect, FIGS. 1 to 6 show some known solutions of joining devices for parts of furniture and furnishing items, for example between a shoulder of a piece of furniture and a base, which could in any case be a common shelf or top.

In the known solution illustrated in FIGS. 1 and 2, holes must be provided in both of the two shoulders 11, 12 and in a base 13 and in a top 14 of a piece of furniture. In particular, these are both partially shown in the section of FIG. 2 which shows a connection part of the same. The shoulder 11, in fact, provides a horizontal blind hole 15 and the base 13 even provides double holes 16, 17. More specifically, a horizontal hole 16 to be aligned with the hole 15 of the shoulder 11, and a vertical hole 17, formed in the upper surface of the base 13, which intersects the first hole 16, for the insertion of a blocking element, for example a grub screw 18 (headless metal screw), wherein both holes are blind.

Said hole 15 has an axis A which is perpendicular to the shoulder 11.

This known joining device provides the positioning of a pin 19 with a first threaded end 20 inside an internally threaded bush 21 positioned in the hole 15 of the shoulder 11. The pin 19 contains, at the other end 22, a housing 23 for an end of the grub screw 18.

A bush 24 is housed in the vertical hole 17 of the base 13, which provides a horizontal pass-through hole 25 for receiving the protruding end 22 of the pin 19 and a vertical threaded pass-through hole 26 which receives the grub screw 18.

By thus positioning said elements forming the known joining device and juxtaposing the shoulder and the base according to the arrow F, as shown in FIG. 2, the coupling of FIG. 2 is obtained, with the pin 19 inserted in the hole 16 of the base 13 and in the bush 24.

The grub screw 18 is then screwed, with a tool (not shown), into the bush 24 so that the tip of the grub screw 18 is positioned in the housing 23 provided at the free end 22 of the pin 19.

The tightening of the grub screw 18 pushes the base 13 against the shoulder 11 creating the final stable position shown in the same FIG. 2.

In this known solution, the blocking group is in the base 13 and identically in the top 14, it is arranged perpendicular to the base and to the movement or approach direction and tightening between the shoulder and base and top. Only the relative pin, with which the blocking group cooperates, is provided in the thickness of the shoulder or side panels.

This final assembled position shown in FIG. 1 also illustrates as a whole how the end of the holes 17 which are normally covered with a closing cap (not shown), are present on the upper surface of the base 13 and on the lower surface of the top 14.

Said hole and the corresponding cap form a visible part of the joining device which in the first place does not have an aesthetically valid appearance as, although there is the presence of the cap, it shows how the joint has been formed. Furthermore, the cap itself, which is difficult to be brought specifically in line with the surface of the base, represents an obstacle for the insertion of any object, creating a protrusion, even if minimum, with respect to the upper surface of the base.

Furthermore, the presence of at least two holes in the base for each joint, intersecting each other, causes a weakening of the base itself that must sustain loads representing a possible cause of breakage.

FIGS. 3 and 4 show a similar situation in which the elements forming the known joining device are arranged whereby that of the shoulders is in the base and top and vice versa with respect to the previous example.

For the sake of simplicity, equivalent elements are indicated with the same numbers with the addition of the index —'—.

In short, a vertical blind hole 15' is provided in the base 13 and in the top 14, and each of the shoulders 11 provides a double hole 16' and 17'. More specifically, a vertical hole 16', to be aligned with the hole 15' of the base 13 (or top 14), and a horizontal hole 17', formed in the relative shoulder 11, which insects the first hole 16', for the insertion of a blocking element, for example a grub screw 18', wherein both holes are blind.

Said hole 15' has an axis A' which is perpendicular to the base 13 and top 14.

Furthermore, as already specified, the joining device provides a pin 19' with a first threaded end 20' inside an internally threaded bush 21' positioned in the hole 15' of the base 13 or top 14. The pin 19' contains, at the other end 22', a housing 23' for an end of the grub screw 18'.

A bush 24' is housed in the vertical hole 17' of the shoulder 11, which provides a horizontal pass-through hole 25' for receiving the protruding end 22' of the pin 19' and a horizontal threaded pass-through hole 26' which receives the grub screw 18'.

By thus positioning said elements forming the known joining device and juxtaposing the shoulder and the base according to the arrow F', as shown in FIG. 4, the coupling of FIG. 4 is obtained, with the pin 19' inserted in the hole 16' of the shoulder 11 and in the bush 24'.

This solution also has the same problems relating to the holes and corresponding caps of the joining device for the most part visible, that do not have an aesthetically valid appearance and create the hindrances and weakening previously indicated.

In the case of the joining of shoulders, base and top or shelf with facing surfaces 27 at 45°, the problems indicated are doubled as a much greater number of holes is required.

FIGS. 5 and 6 show this known solution wherein equivalent elements are indicated with the same numbers with the addition of the index —"—.

The figures clearly show that the hole 15 or 15' of the two previous cases is not present, but holes 16, 17 or 16', 17' are formed in all the elements of the furniture (shoulders, base and top) in facing parts, as previously indicated. In this case, they are indicated as 16" and 17".

In this case, in fact, it can be observed from FIGS. 5 and 6 that the joining device provides a pair of pins 19" without threaded ends but joined to each other by means of a hinged pin 28 which is positioned inside holes 16" of the base 13 or top 14 and also a respective shoulder 11. The abovementioned holes 17", moreover, are arranged in the base 13 or in the top 14 and also in a respective shoulder 11, perpendicular to the holes 16".

The pins 19", thus connected to each other, contain at the other free end 22", a housing 23" for an end of the grub screw 18".

Analogously, a bush 24" is housed in the two holes 17" of the shoulder 11 or base 13 or top 14, which provide a pass-through hole 25" for receiving the protruding end 22" of the respective pin 19" and a threaded pass-through hole 26" which receives the grub screw 18".

By thus positioning said elements forming the known joining device and juxtaposing the shoulder and the base or the shoulder and the top according to the facing surfaces 27 at 45°, the stable coupling of FIG. 6 is obtained, once the grub screws 18" have been inserted, blocking them in position.

This further solution, however, also has the same problems relating to the significant number of holes and corresponding caps of the joining device for the most part visible, that do not have an aesthetically valid appearance and create the hindrances and weakening previously indicated.

EP 2 705 775 A1 relates to a system for the combined hanging of a furniture module and a shelf, thanks to the presence of two different brackets fixed to the wall and collaborating with each other, of which the first is dedicated to the furniture module and the second to the shelf. The shelf 53A is in fact hung by means of brackets RMA and the furniture module by means of brackets 52. This arrangement of brackets, however, relates to the positioning of both the furniture module and the shelf with respect to the wall P to which they must both be hung.

WO 2009/094720 A1 relates to a joining device between a first and a second panel according to the known technique previously indicated comprising a blocking group and a connection group, wherein the final screws of the blocking group are clearly visible inside one of the two panels to be connected.

A general objective of the present invention is therefore to provide a joining device between parts of furniture and furnishing items, such as a shoulder or a base, capable of solving the drawbacks of the known art indicated above, in an extremely simple, economical and particularly functional manner.

A further objective of the present invention is therefore to provide a joining device between parts of furniture and furnishing items, such as a shoulder and a base or a top, which is not visible to an observer and consequently has a high aesthetical value, as it has no holes or in any case no maneuvering element of the joining device on the front part of all the furniture elements indicated above.

Another objective of the present invention is to provide a joining device between parts of furniture and furnishing items, such as a shoulder and a base or a top, which does not have any protrusion with respect to the upper surface of the base or lower surface of the top.

The structural and functional characteristics of the present invention and its advantages with respect to the known art will appear even more evident from the following description, referring to the enclosed schematic drawings which show embodiment examples of the same invention. In the drawings:

FIGS. 7 and 8 are perspective views from the front and from the back of a piece of furniture using a first embodiment of joining devices according to the present invention for stably connecting parts of the same furniture and similar furnishing items, positioned for example between the two shoulders of the furniture and a base and a top or shelf respectively;

FIG. 9 is an enlarged sectional view with highlighted and enlarged details further illustrating parts of two joining devices, for example between two shoulders of the furniture and a base or in any case a shelf of FIG. 7, according to a first embodiment of the invention;

Figure 1:
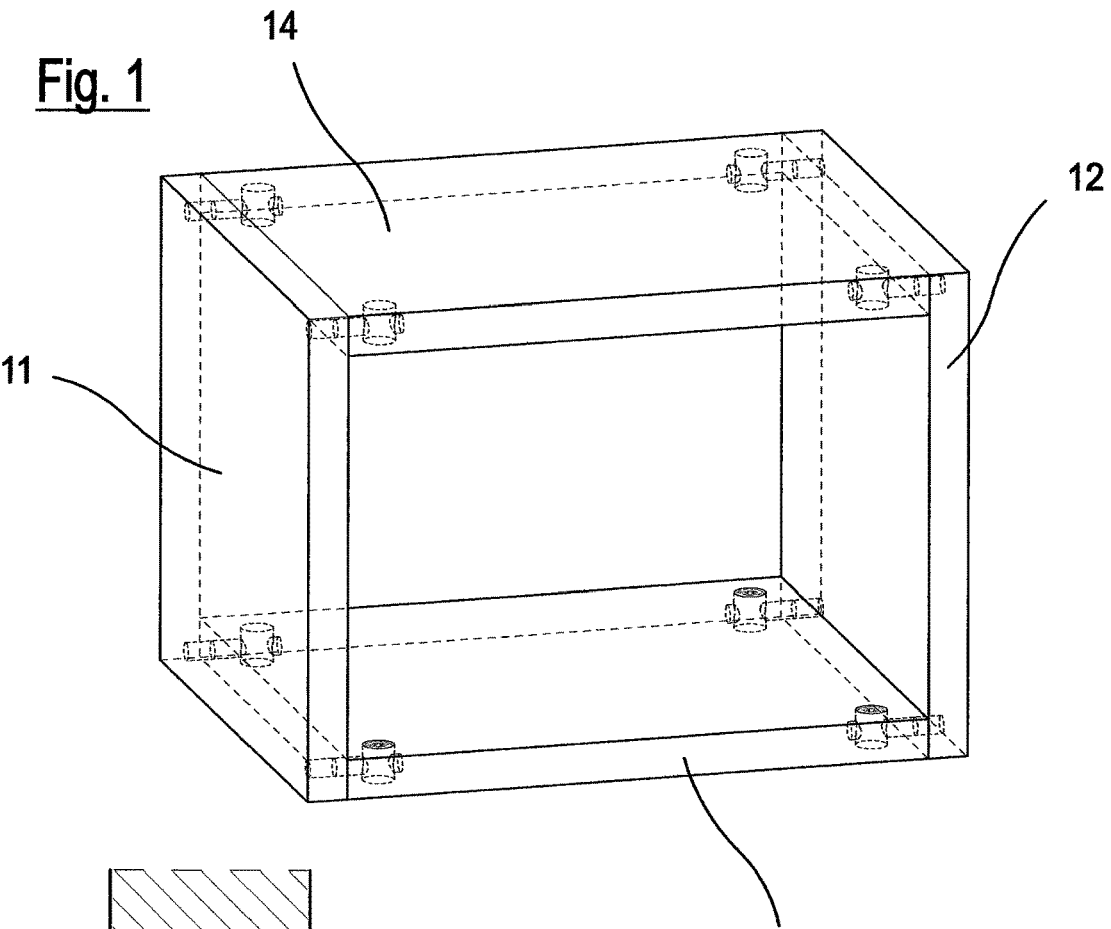
FIGS. 1 and 2 are a perspective view of a piece of furniture and a sectional view illustrating a first embodiment of joining devices of the known art positioned in parts of furniture and furnishing items, for example between a shoulder of a piece of furniture and a base or in any case a top or shelf.
Figure 2:
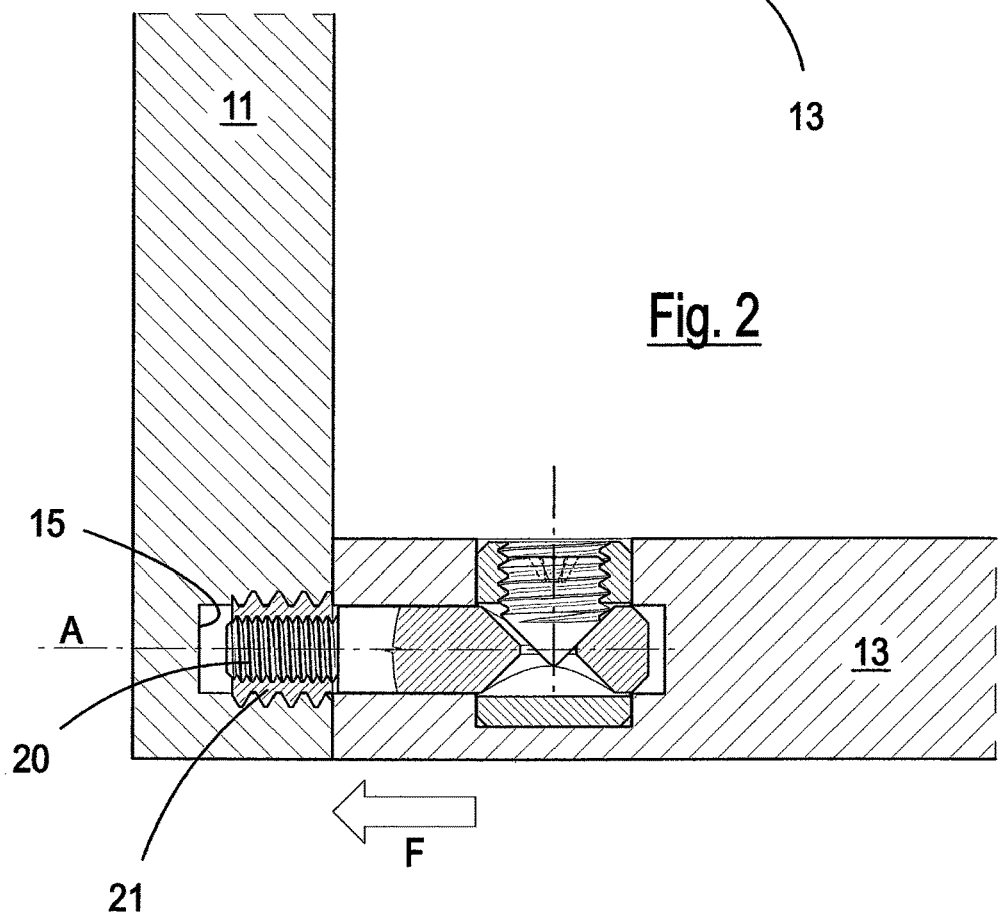
Figure 3:
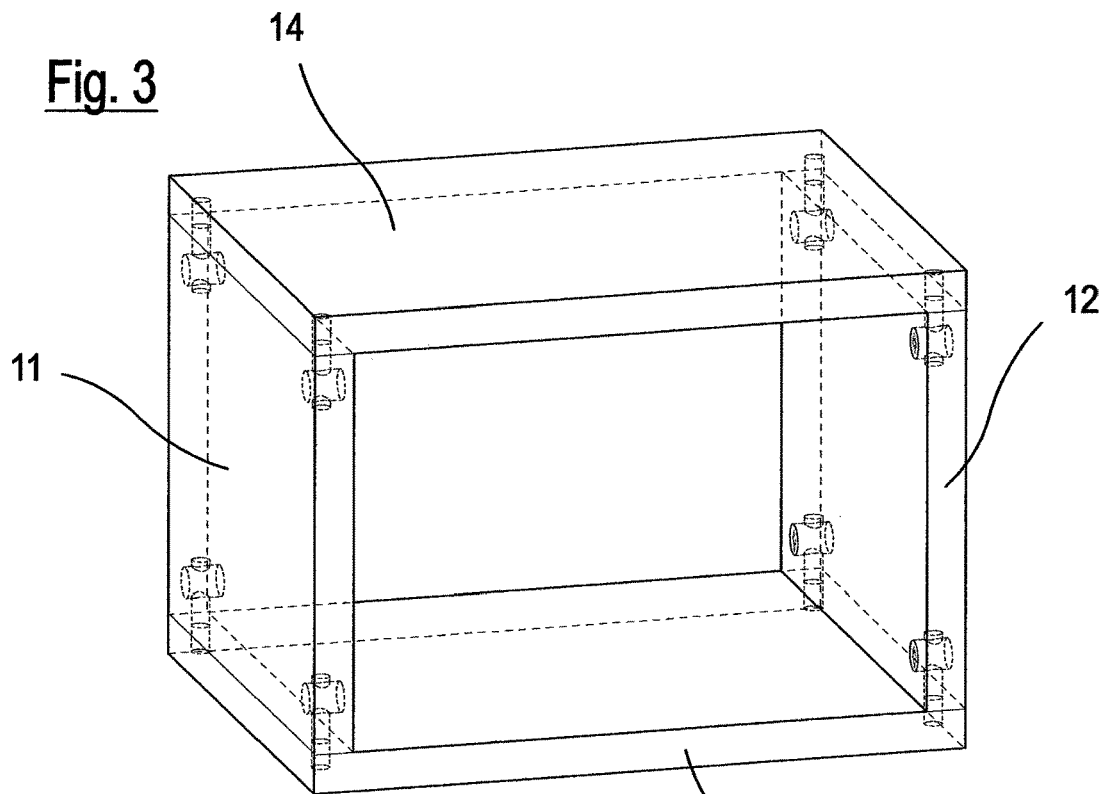
FIGS. 3 and 4 are a perspective view of a piece of furniture and a sectional view illustrating a second embodiment of joining devices of the known art positioned in parts of furniture and furnishing items, for example between a shoulder of a piece of furniture and a base or in any case a top or shelf.
Figure 4:
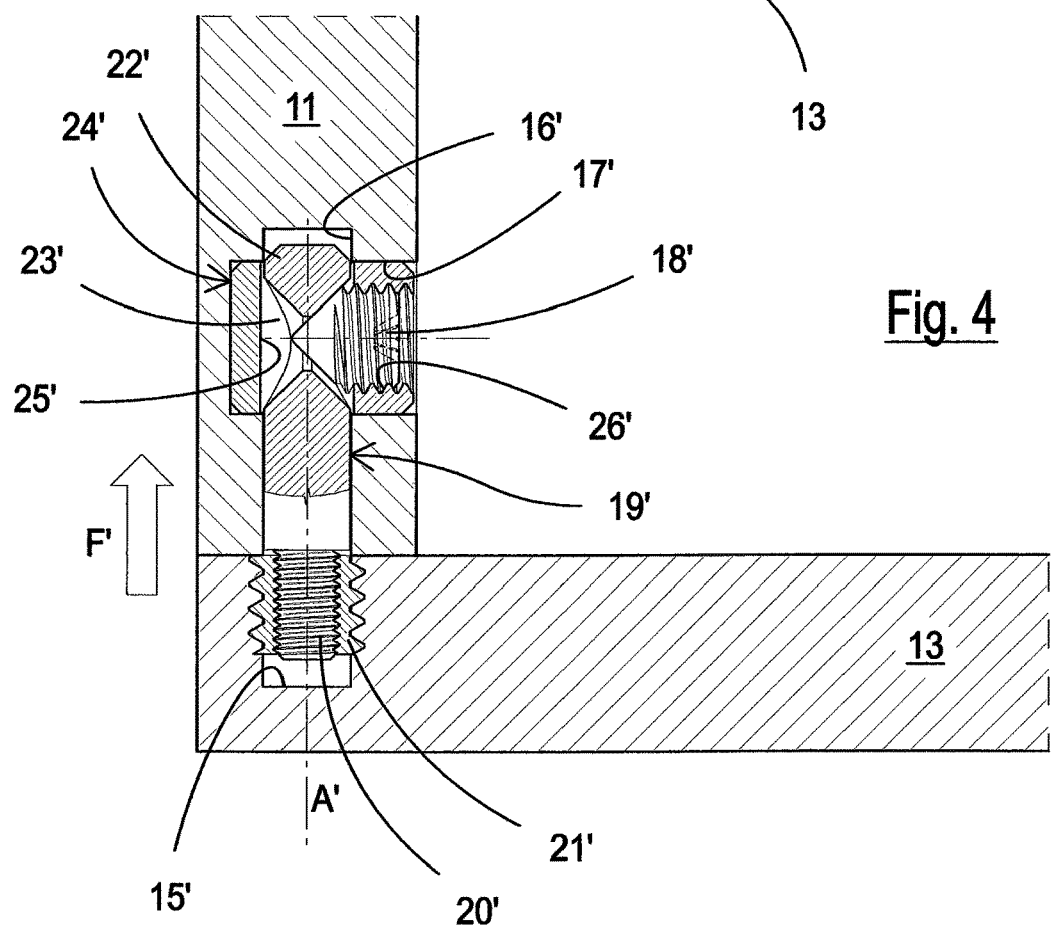
Figure 5:
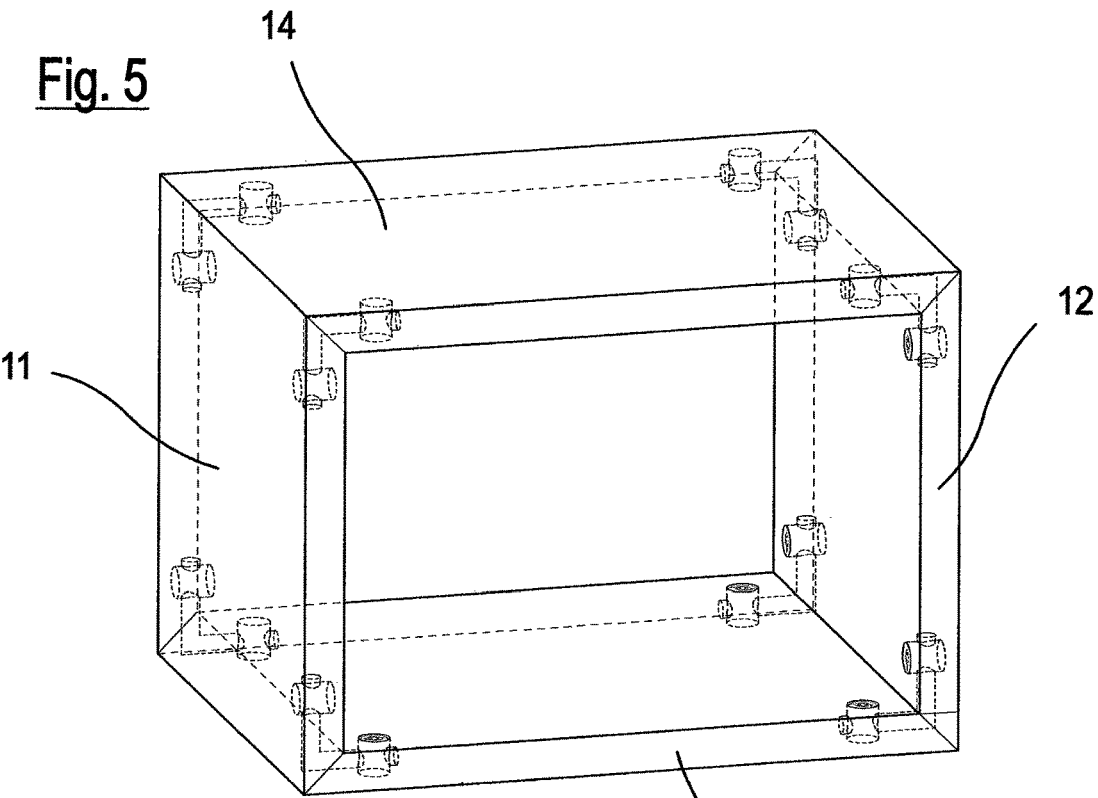
FIGS. 5 and 6 are a perspective view of a piece of furniture and a sectional view illustrating a third embodiment of joining devices of the known art positioned in parts of furniture and furnishing items, for example between a shoulder of a piece of furniture and a base or in any case a top or shelf.
Figure 6:
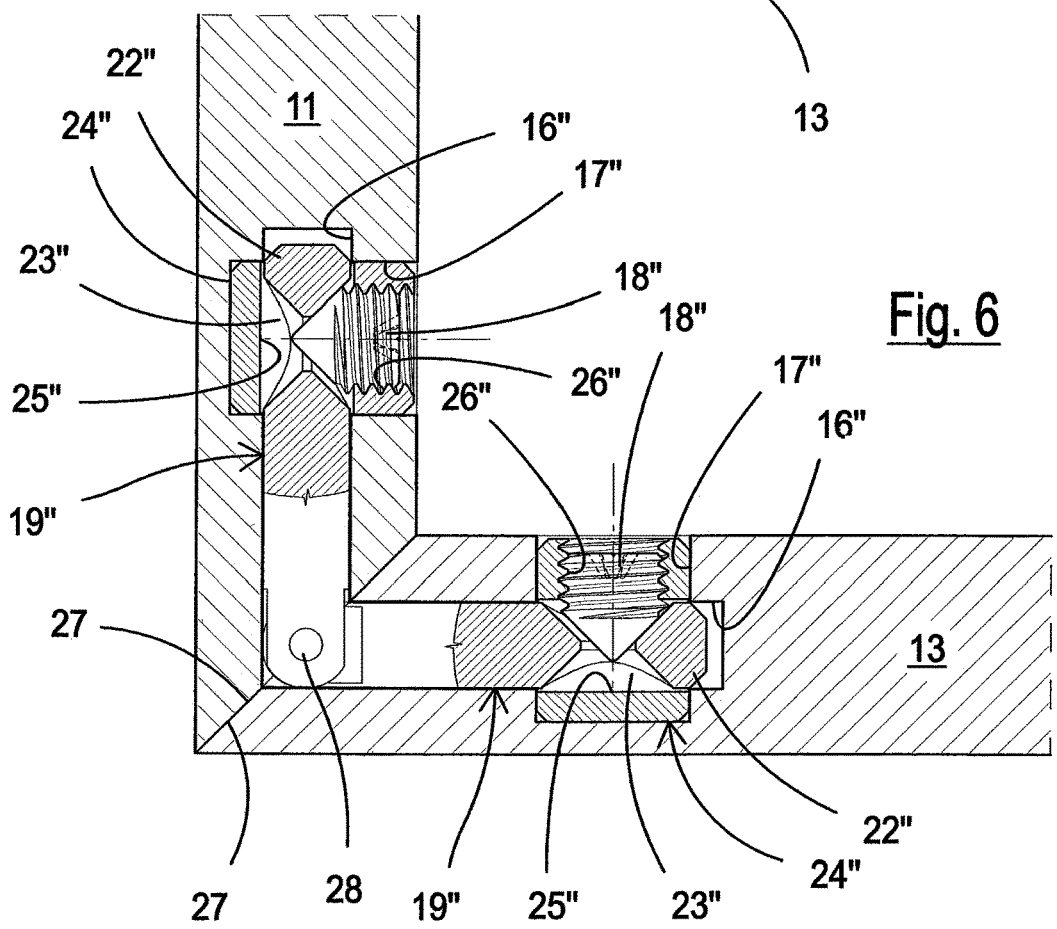

With reference first of all to FIGS. 7 to 13, these show a first embodiment of joining devices for parts of furniture and furnishing items according to the invention. In the example, the joining device must connect and join a first panel 11, for example a shoulder of a piece of furniture and a second panel 12, for example a base 12, or in any case a different panel or shelf or top, shown in the figures. In particular, they must be moved towards each other according to an approach direction (d) in order to bring the edge (B) of one panel abutted in a tightening position against a surface (S) of the other panel.

As illustrated in the examples, the first panel 11 and the second panel 12 are generally perpendicular to each other but they may also be tilted with respect to each other.

In this non-limiting example, the second panel or base 12 contains, close to one of its end sides (positioned perpendicular to the rear part of the furniture when assembled) a seat S1—for a blocking group GB—, in the form of a horizontal blind hole 30, arranged parallel to the side of the base 12, in which an elongated bushing or tubular element 31 is block-inserted. Said blind hole 30 intersects with a first and a second horizontal blind hole 32, 33, perpendicular to it and spaced apart, also formed in the second panel or base 12. And this is the case for both of the opposite sides of the base or shelf 12.

Each of these first and second holes 32, 33 receives a protruding part of a pin 34, 34' whose end is positioned in a shoulder 11 in a respective seat S2 in the form of a horizontal blind hole 35. A bushing 36 internally threaded for receiving a threaded end 37 of the pin 34, 34' is block-inserted in said blind hole 35. Said pin 34, 34' defines a connection group GC to be firmly blocked for stably interconnecting the shoulder 11 and the base 12, as explained in more detail hereunder.

Furthermore, the pin 34, 34' comprises in its protruding part, a housing 38, 38' for the tip of a blocking grub screw (headless metal screw) 39, 39'.

The pin 34, 34' defines a connection group GC to be firmly blocked for stably interconnecting the shoulder 11 and the base 12, as explained in more detail hereunder.

With respect to the base 12 for each blocking group GB, the seat S1 extends from a rear perimetric edge B1 of the base 12 towards the inside of the base or panel itself 12.

The elongated bushing or tubular element 31 is housed in the horizontal hole 30 of each group GB, and in the example illustrated in FIG. 9 is abutted against the blind bottom of the same hole 30.

The elongated bushing or tubular element 31 is hollow and provides two transversal pass-through holes 40, 40' which are in such a position as to be aligned with said two blind holes 32, 33, spaced apart and formed in the second panel or base 12, when the bushing 31 is completely inserted in the hole 30.

It should also be pointed out that the hollow bushing 31 in the proximity of the two transversal pass-through holes 40, 40' provides threaded sections of internal surface 41, 41' suitable for being complementarily engaged with outer threaded surfaces of the blocking grub screws 39, 39'.

It should also be noted that the first grub screw 39 is centrally perforated in 48 so as to allow the passage of a thin stem 46 of a rotation driving tool 45, whereas the second grub screw 39' has only one seat 44 for the tip of a normal screwdriver 47, also present, however, in the first grub screw 39.

Both the base or panel 12 and the shoulders 11 in facing coupling areas during assembly, preferably, but not necessarily, have various blind holes 42 each suitable for receiving on one side and on the other, half of the blocking plugs or dowels 43 which collaborate for a stable positioning of the parts, when assembled.

Consequently, the components 38, 39 on one side and 38', 39' on the other, create a blocking group GB suitable for acting on the above-mentioned connection group GC composed of the pin 34, 34', as explained hereunder.

Figure 10:
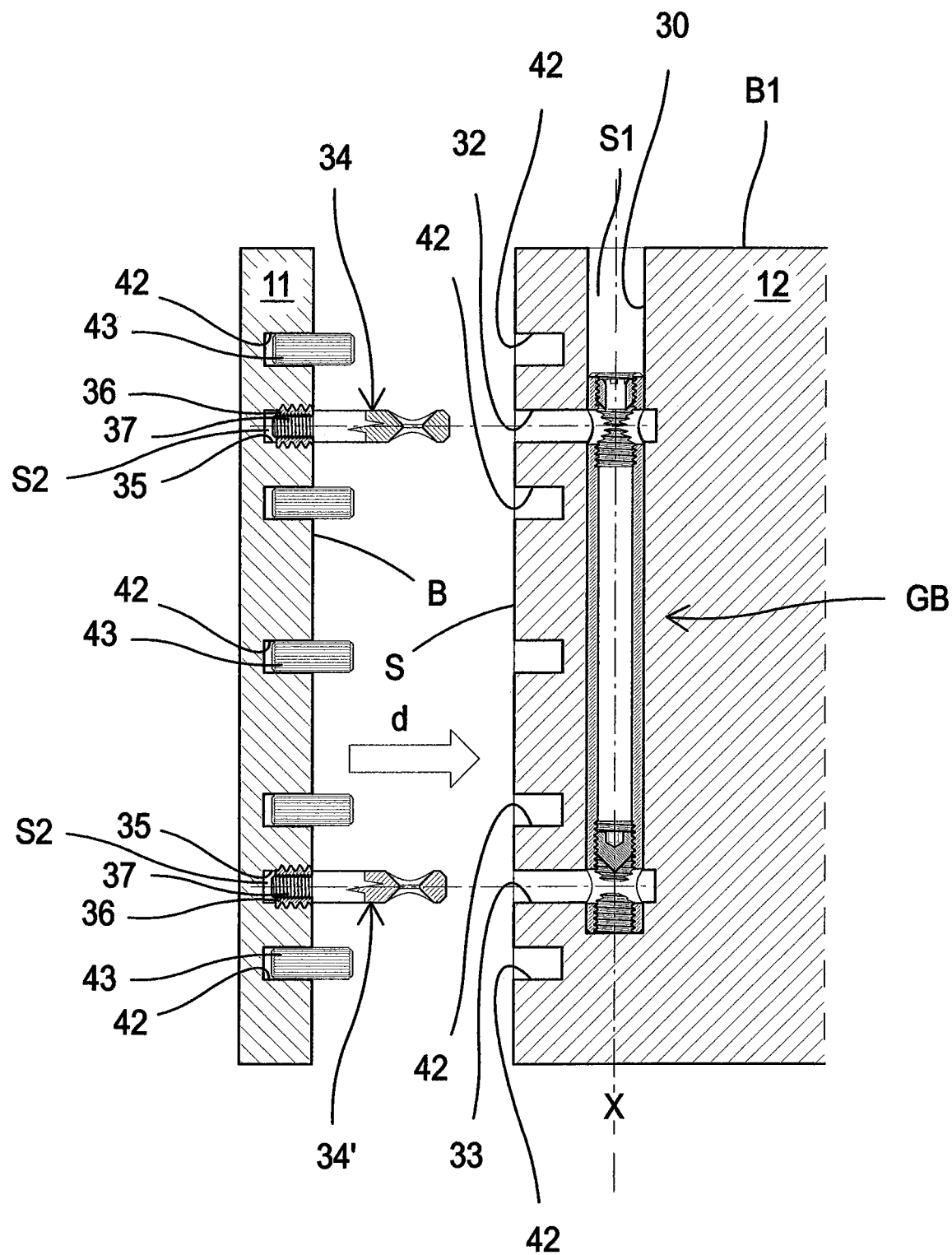
FIGS. 10, 11 and 12 are sectional details of FIG. 9 with a joining device and relative shoulder and shelf in an exploded view and respectively with a device assembled and actuated by means of a screwdriver introduced into the same, once said parts have been juxtaposed and inserted in each other, for actuating the two parts of the joining device.

First of all, the various components must be positioned for each joining device group arranged on the piece of furniture, i.e. in its parts (base or shelf or shoulders), as shown in FIG. 10.

The pins 34, 34' (and also the blocking plugs or dowels 43) are in fact positioned in the shoulders 11 in the respective seats or holes 35 and 42. The elongated bushings or tubular elements 31 are positioned in the base or shelf 12 in the holes 30 or seats S1 so that they are abutted on the bottom of the holes 30. The grub screw 39' is first inserted immediately afterwards in correspondence with the section of internal threaded surface 41' close to the transversal hole 33 and the grub screw 39 immediately afterwards in correspondence with the section of internal threaded surface 41 close to the transversal hole 32.

The grub screws 39 and 39' must be inserted so as to allow the passage of the free ends of the pins 34, 34', when each shoulder 11 is moved towards the base or shelf 12. In this way, the pins 34 and 34' are completely inserted in the respective hole 32 and 33, in the position illustrated in FIG. 11, with the dowels or plugs 43 also inserted in the respective holes 42 of the base or shelf 12.

The edge B of the shoulder 11 is then moved towards the surface S of the base 12, inserting the protruding part of the pins 34, 34' into the horizontal holes 32 and 33 of the base 12.

Figure 11:
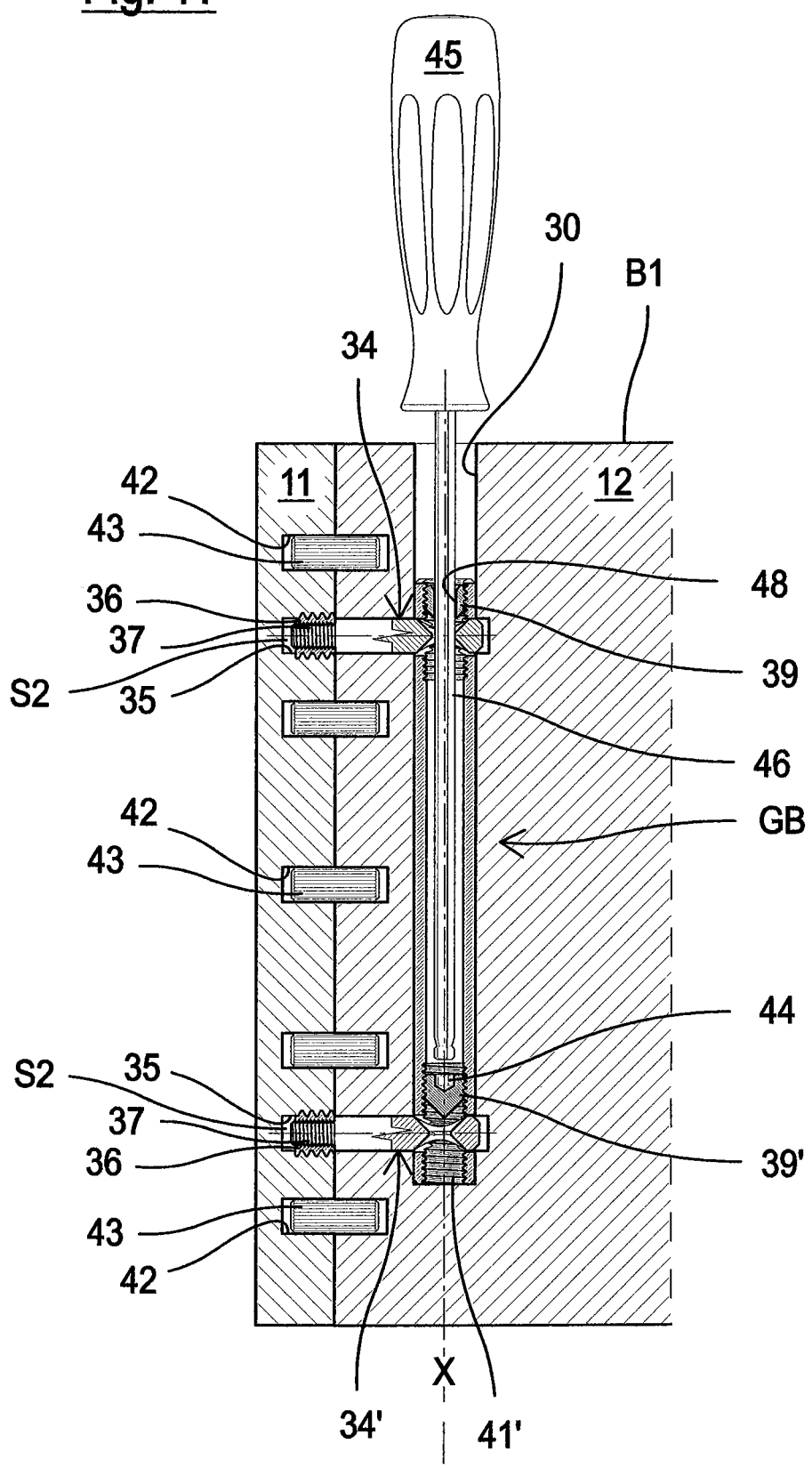

At this point, the rotation driving tool 45 is inserted, passing into the hole 48 of the grub screw 39 until it reaches the seat 44 of the second grub screw 39'. A rotation of the same causes the stable positioning of the grub screw 39' in the housing 38' of the pin 34' causing the blockage of the parts (FIG. 11).

Figure 12:
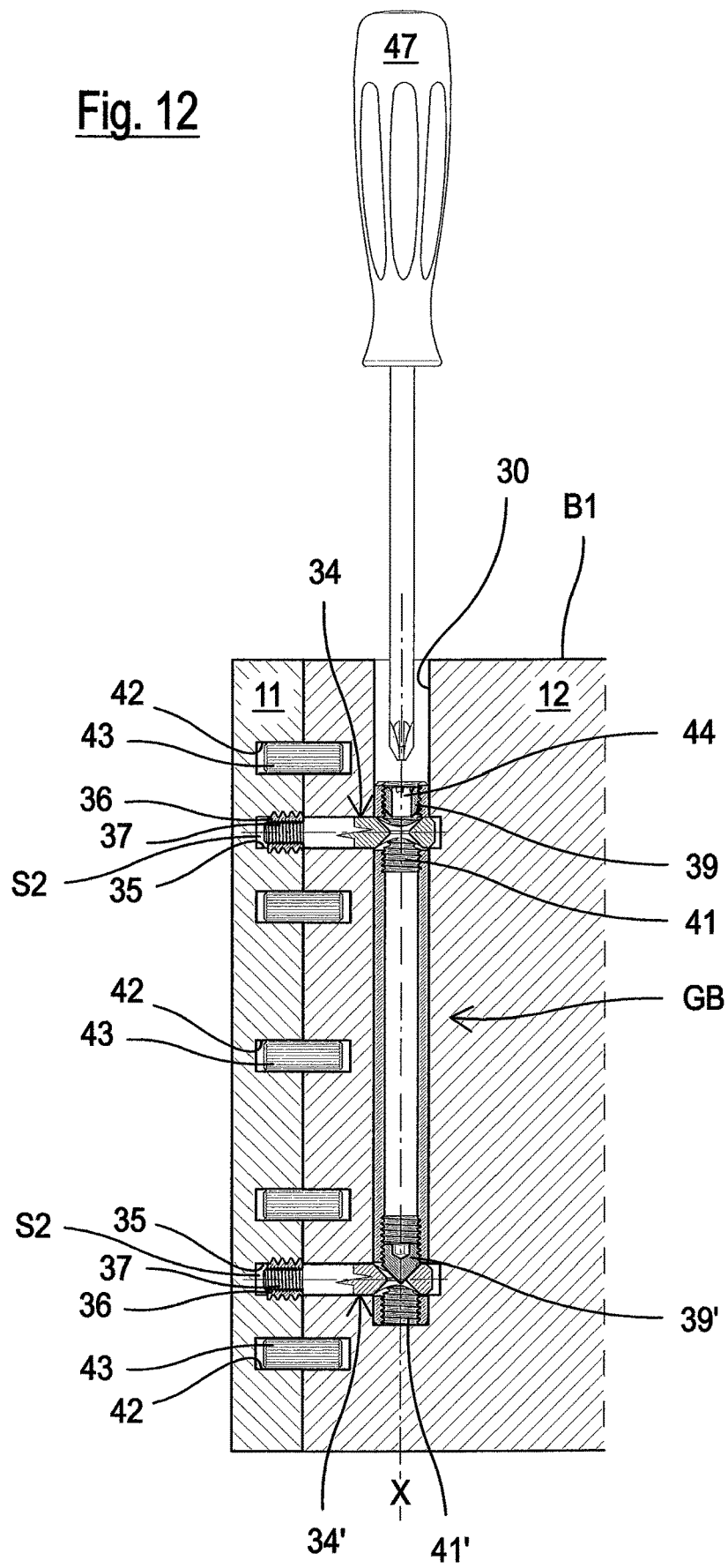
Figure 13:
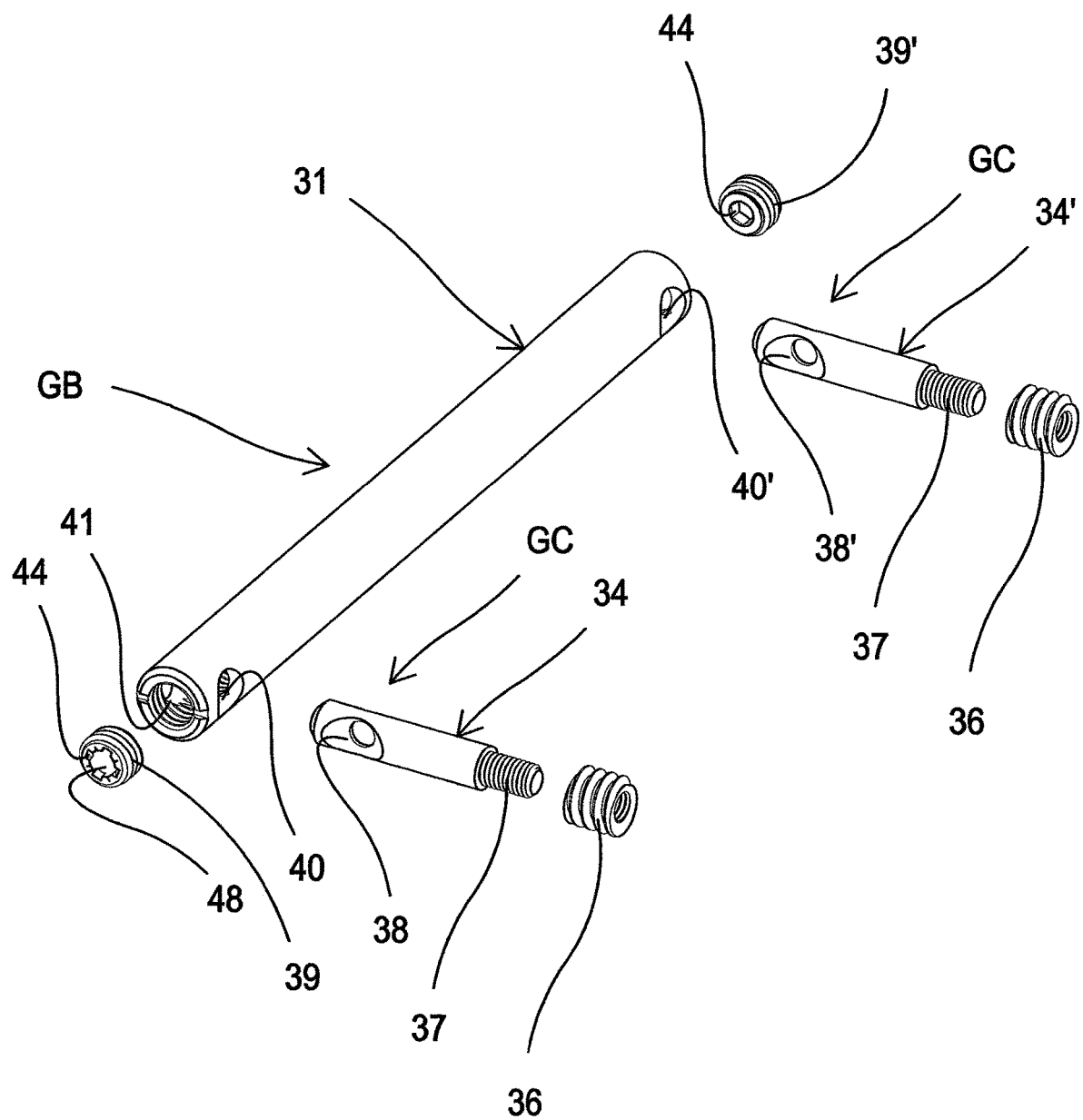
FIG. 13 is an enlarged perspective view that shows parts of a device used in FIGS. 7 to 12, when exploded and spaced from each other.

The pin 34 is then also stably positioned using a normal screwdriver 47 inserted in the seat 44 of the first grub screw 39, causing the grub screw 39 to be positioned in the housing 38, as clearly shown in FIG. 12.

It can thus be seen how, in this first embodiment, the joining device of the present invention essentially comprises a blocking group GB (39, 39') inserted inside a seat S1 in the form of an elongated horizontal hole 30 of the base 12, which acts on a pin connection group GC 34, 34' to be blocked, positioned inside a seat S2 of the shoulder 11 and which extends from a horizontal hole 35 formed laterally with respect to the shoulder 11 itself.

More generally, regardless of what is shown in this first example, it is provided, according to the invention, that the blocking group GB be inserted inside a seat S1 completely contained in a thickness SP of the base or shelf 12 as desired (FIG. 7).

It should be noted that the longitudinal axis x of the seat S1 or hole 30 extends perpendicular to the approach direction d and tightening of the shoulder or first panel 11 to the base or shelf or second panel 12, as can be clearly seen in FIG. 10.

It is confirmed that the seat S1 has an axis X perpendicular to the direction d and that it extends from a rear edge B1 of the single panel 12 (or 11) towards the inside of the panels 12 (or 11).

As can be clearly seen in the examples of the drawings, the blocking group GB is inserted inside the seat S1 which is contained in the thickness SP of the base or shelf 12 on which the blocking group GB is applied, wherein the seat S1 extends from the edge B1 towards the inside of the base 12 according to an axis X which is perpendicular to the above-mentioned direction d.

This is the case in the example shown in FIGS. 7 and 8 for all four joining devices provided in the piece of furniture or part of it.

It is completely evident how the only holes that are visible are formed in the rear part of the bases and/or shelves 12.

The further holes provided for effecting the joining are included in and hidden by the coupling between shoulders and bases and/or shelves.

All of this naturally without weakening the structural elements of the furniture that must sustain loads and that therefore maintain the same robustness with which they were produced.

FIGS. 14 to 17 are views of a joining device of the invention in a second embodiment used for joining parts of furniture.

Whereas in the first embodiment a blocking group GB associated with a pin connection group GC is used for each joining device, in this second embodiment, the connection group is produced with similar elements arranged in both the two shoulders of the furniture and in the base and top or shelf. Said elements are connected by a hinged pin element which in this example forms the connection group GC previously described. In particular, the joining device of shoulders, base and top or shelf is positioned between furniture elements that have surfaces at 45° 27 facing each other.

Figure 17:
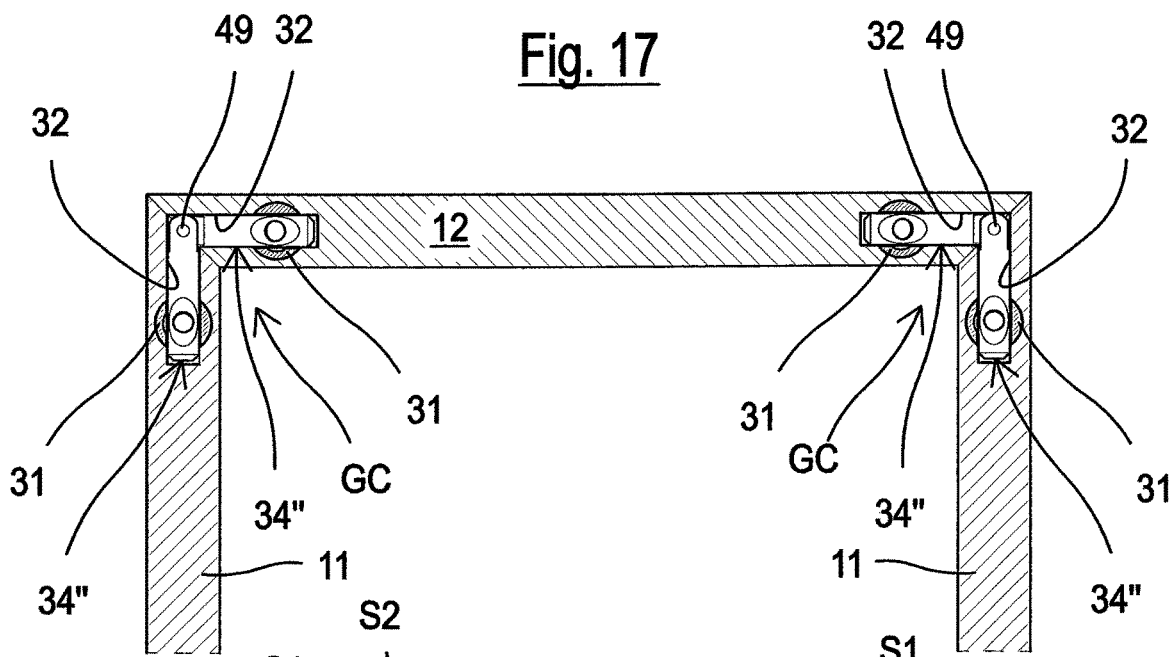
FIG. 17 is a section in correspondence with connection areas according to the line XVII-XVII of FIG. 16 of various details of two joining devices.
Figure 16:
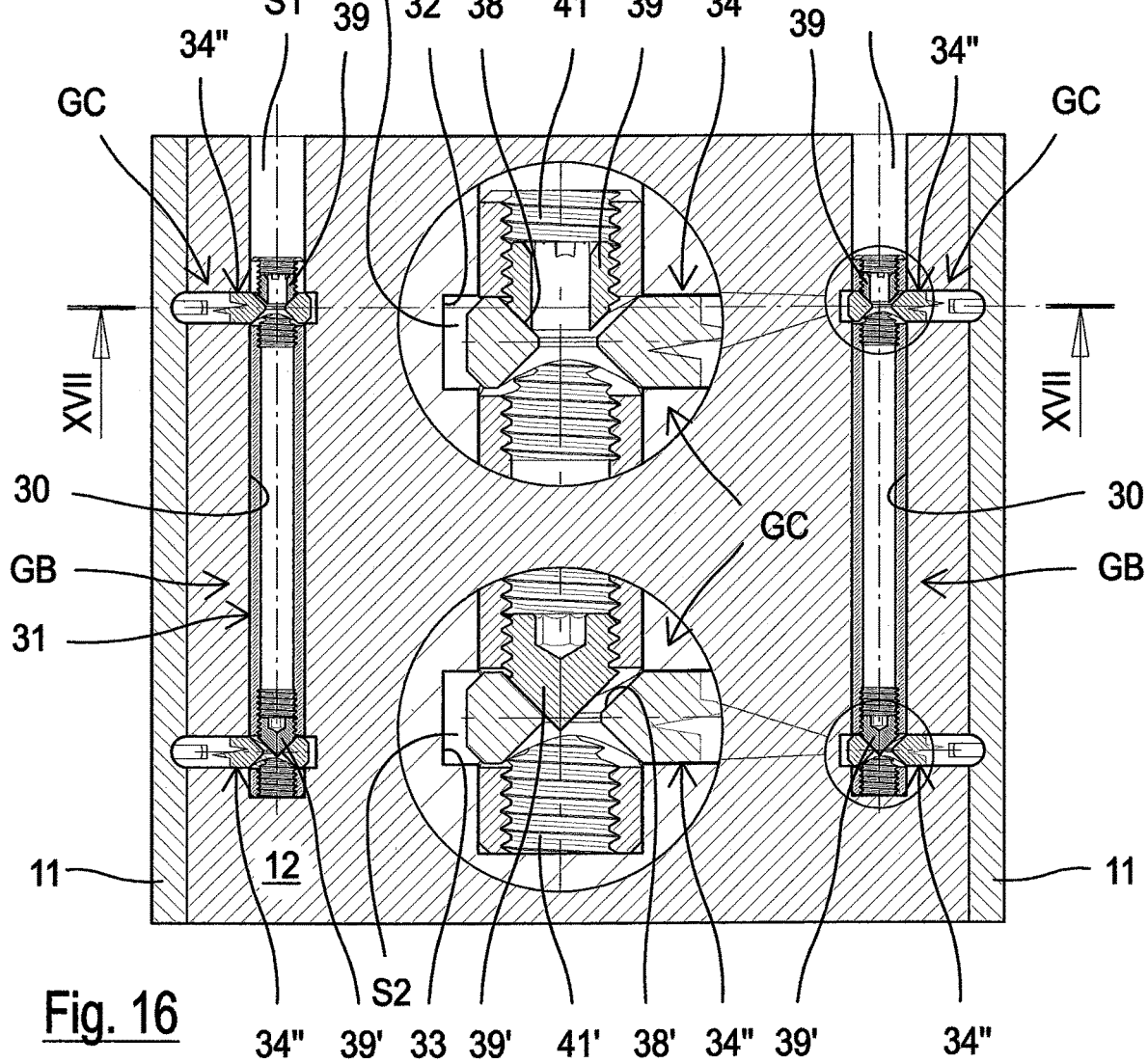
FIG. 16 is an enlarged sectional view with highlighted and enlarged details further illustrating parts of two joining devices of FIGS. 14 and 15 in the second embodiment of the invention.

FIGS. 16 and 17 clearly show this embodiment indicated above.

In this embodiment, the same elements are indicated with the same reference numbers.

In this further non-limiting example, as described for the previous embodiment of FIG. 9, a seat S1 is provided in the single base 12, in the proximity of each of its end sides (arranged perpendicular to the rear part of the furniture when assembled). Said seat S1—for a blocking group GB—is also shown herein as a horizontal blind hole 30, in which an elongated bushing or tubular element 31 is block-inserted. Said blind hole 30 intersects with a first and second horizontal blind hole 32, 33, perpendicular to the same and spaced from each other, which are also formed in the second panel or base 12. This is the case for both opposite sides of the base or shelf 12.

Each of these first and second holes 32, 33, forming a respective seat S2, receives an end of an articulation element of a connection group GC. Each articulation element is composed of two pins 34" articulated by means of a central hinge 49 to the articulation element positioned at facing ends of said pins 34". The pins 34" are inserted in said holes 32, 33 present on both panels or shoulder and base 11, 12.

It should be pointed out, in fact, that what is described for the single base 12 is identically repeated for the single shoulder 11 which thus has a second half of the joining device of this embodiment.

Figure 14:
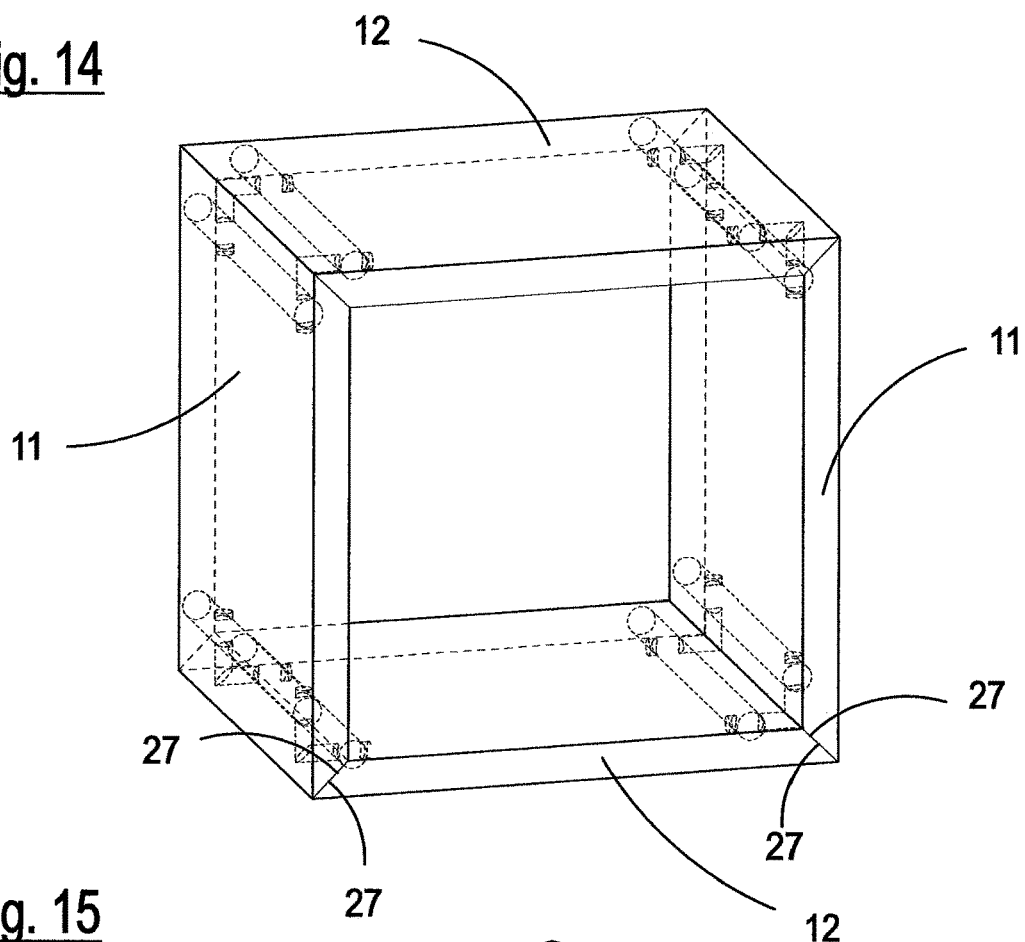
FIGS. 14 and 15 are perspective views from the front and from a different angle, partially sectional, of a piece of furniture that uses a second embodiment of joining devices according to the present invention, in which similar elements connected by a hinged pin are arranged in both the two shoulders of the furniture and also in the base and top or shelf.
Figure 15:
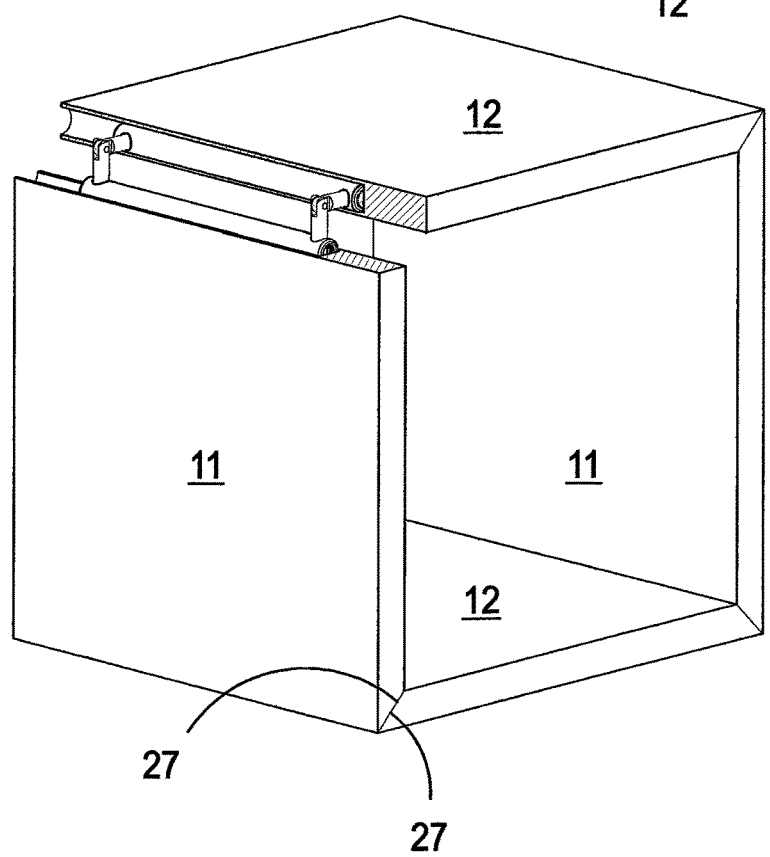

FIG. 17 very clearly summarizes the arrangement of the single articulation element of the connection group GC, whereas FIGS. 14 and 15 show the complete arrangement.

The positioning of the single joining devices of this embodiment is analogous to what has been described for the previous embodiment.

By thus positioning the elements described forming the joining device of this embodiment and juxtaposing the shoulder 11 and the base 12 or the shoulder 11 and the shelf or top 12 according to the facing surfaces 27 at 45°, the stable coupling and also the stable joining of FIGS. 14, 15 and 17 are obtained by means of the grub screws 39, 39', as described for the previous embodiment of FIG. 9.

Figure 18:
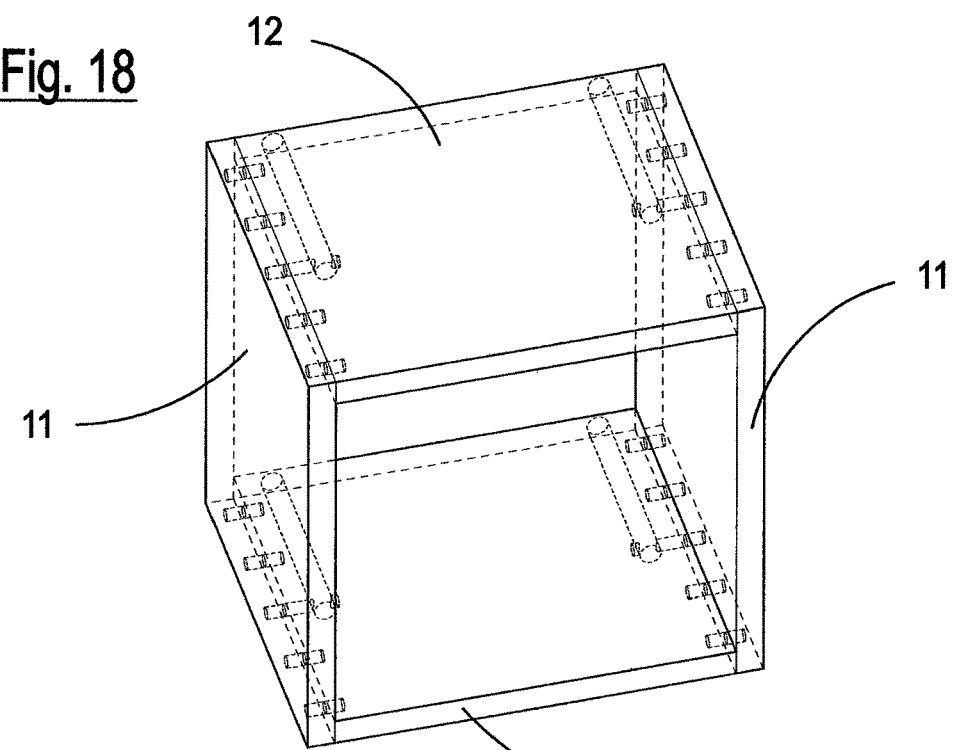
FIG. 18 is a perspective view from the front of a piece of furniture that uses a third embodiment of joining devices according to the present invention, also arranged between the two shoulders of the furniture and the base and top or shelf.
Figure 19:
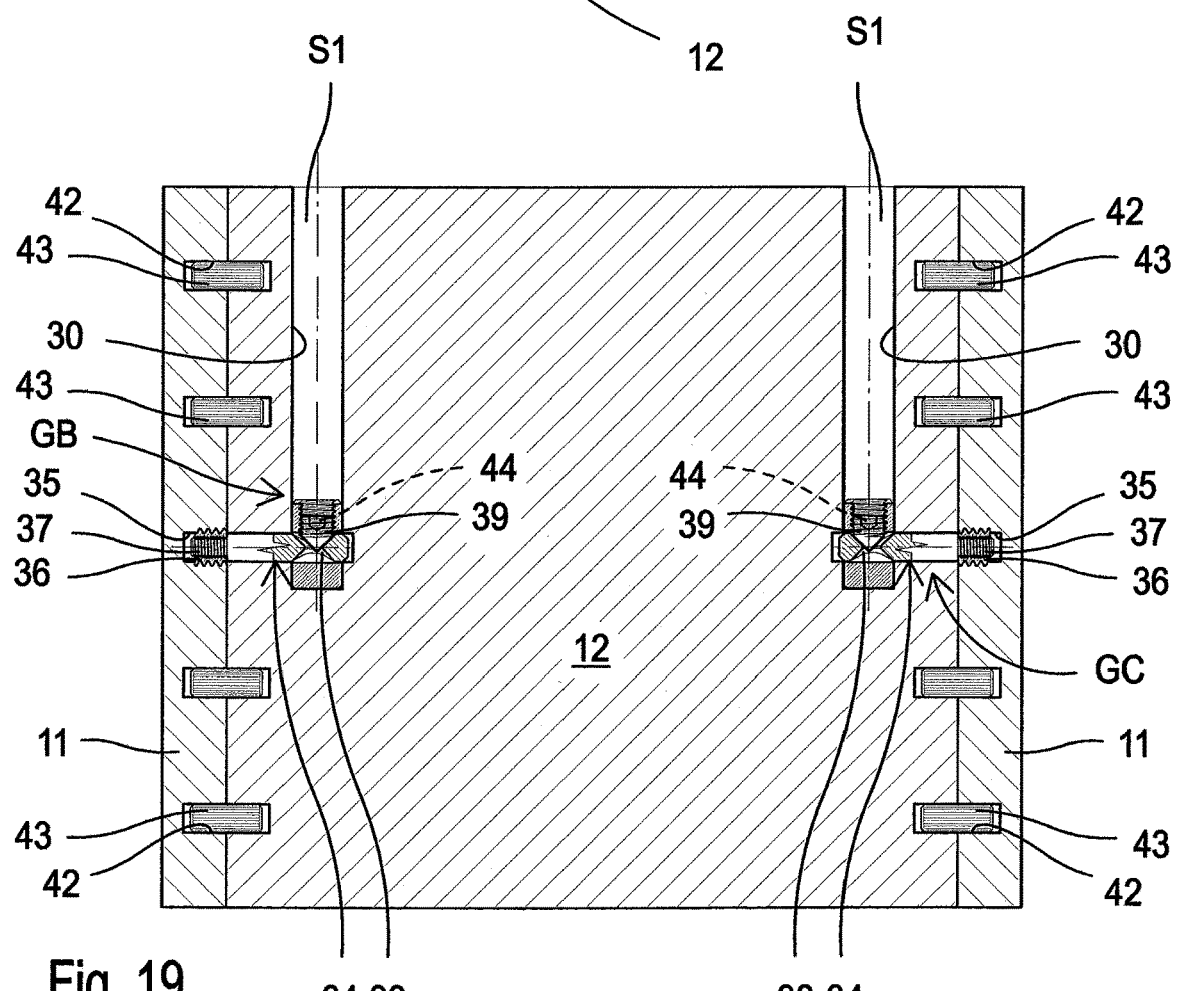
FIG. 19 is an enlarged sectional view of two joining devices of FIG. 18 of the third embodiment of the invention.

FIGS. 18 and 19 show a third embodiment of a joining device of the present invention.

In this third embodiment, the device is extremely simplified as each base or shelf 12 provides a pair of seats S1 each in the form of a horizontal blind hole 30, positioned parallel to each side of the base 12, arranged perpendicular to the rear part of the furniture when assembled.

In this non-limiting example, the seat S1 simply receives a blocking grub screw 39 (which, in this example, defines a blocking group) that can be actuated by means of a common screwdriver (not shown) introduced into the hole 30 from the rear part of the furniture.

The seat S1 or blind hole 30, in an area close to its bottom end, intersects a horizontal blind hole 32 perpendicular to the same, also formed in the second panel or base 12. This is the case for both of the opposite sides of the base or shelf 12.

The hole 32 receives a protruding part of a pin 34 whose end is positioned in a shoulder 11 in a respective seat S2 in the form of a horizontal blind hole 35. A bushing 36 internally threaded to receive a threaded end 37 of the pin 34, is block-inserted in said blind hole 35. The pin 34 defines a connection group GC to be firmly blocked for stably interconnecting the shoulder 11 and the base 12, as for the previous examples.

As in the previous examples, the pin 34 provides a housing 38 in its protruding part for the tip of the blocking grub screw 39.

The introduction of a screwdriver into the hole 30 allows the blocking grub screw 39 to be actuated through the seat 44 to be positioned inside the housing 38 of the pin 34, previously inserted in the hole 35.

Figures 20, 21:
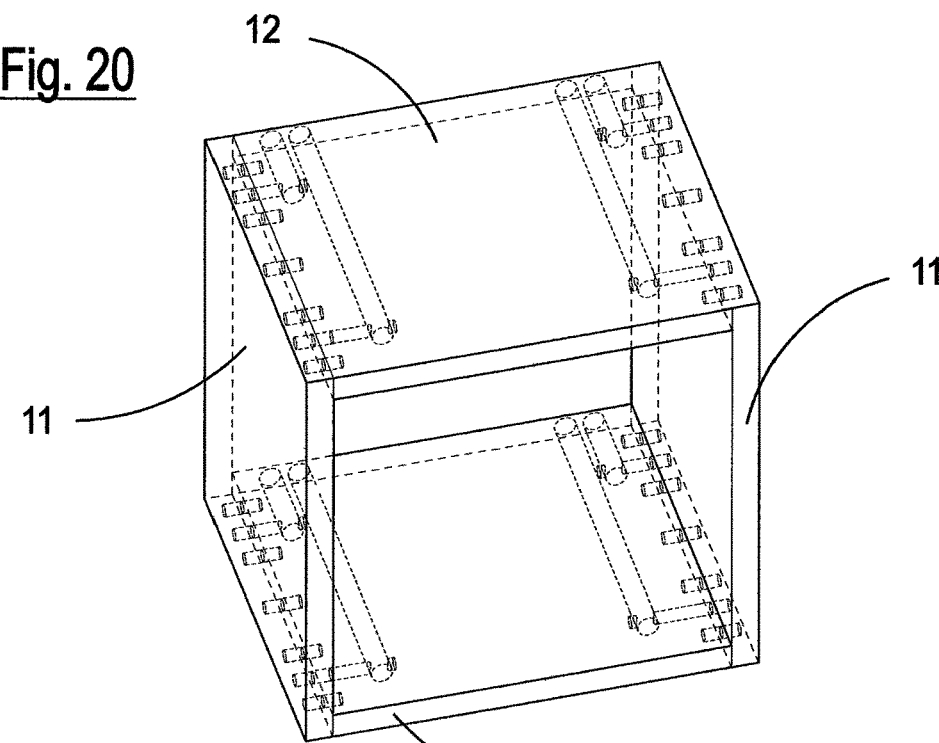
FIG. 20 is a perspective view from the front of a piece of furniture that uses a fourth embodiment of joining devices according to the present invention, also arranged between the two shoulders of the furniture and the base and top or shelf.
FIG. 21 is an enlarged sectional view of two joining devices of FIG. 20 of the fourth embodiment of the invention.
Figure 22:
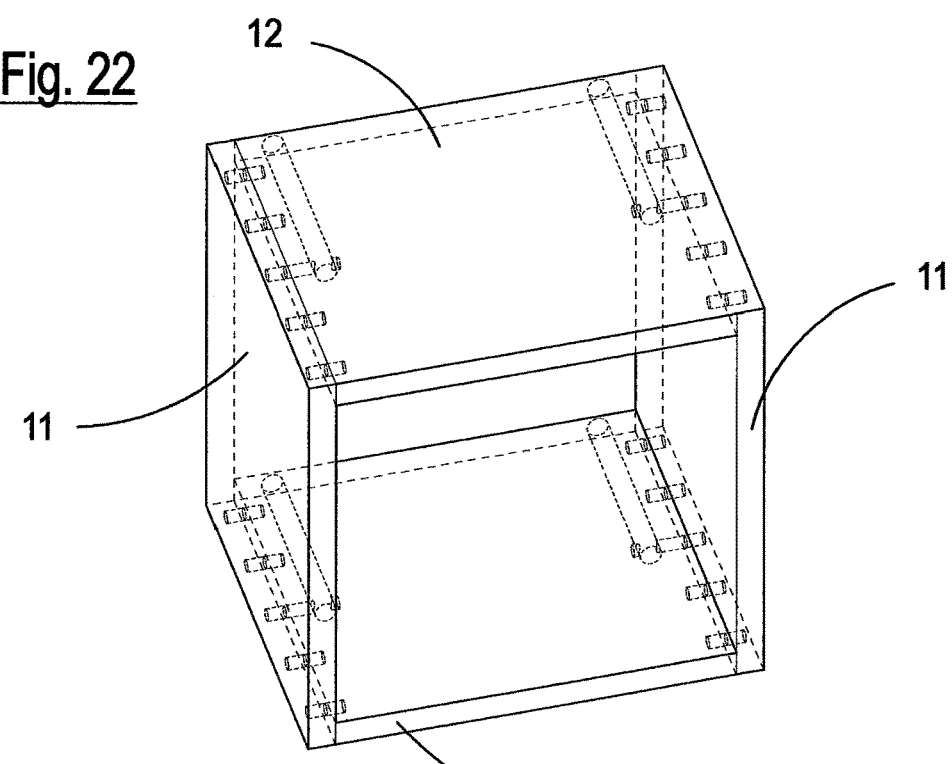
FIG. 22 is a perspective view from the front of a piece of furniture that uses a fifth embodiment of joining devices according to the present invention, also arranged between the two shoulders of the furniture and the base and top or shelf.
Figure 23:
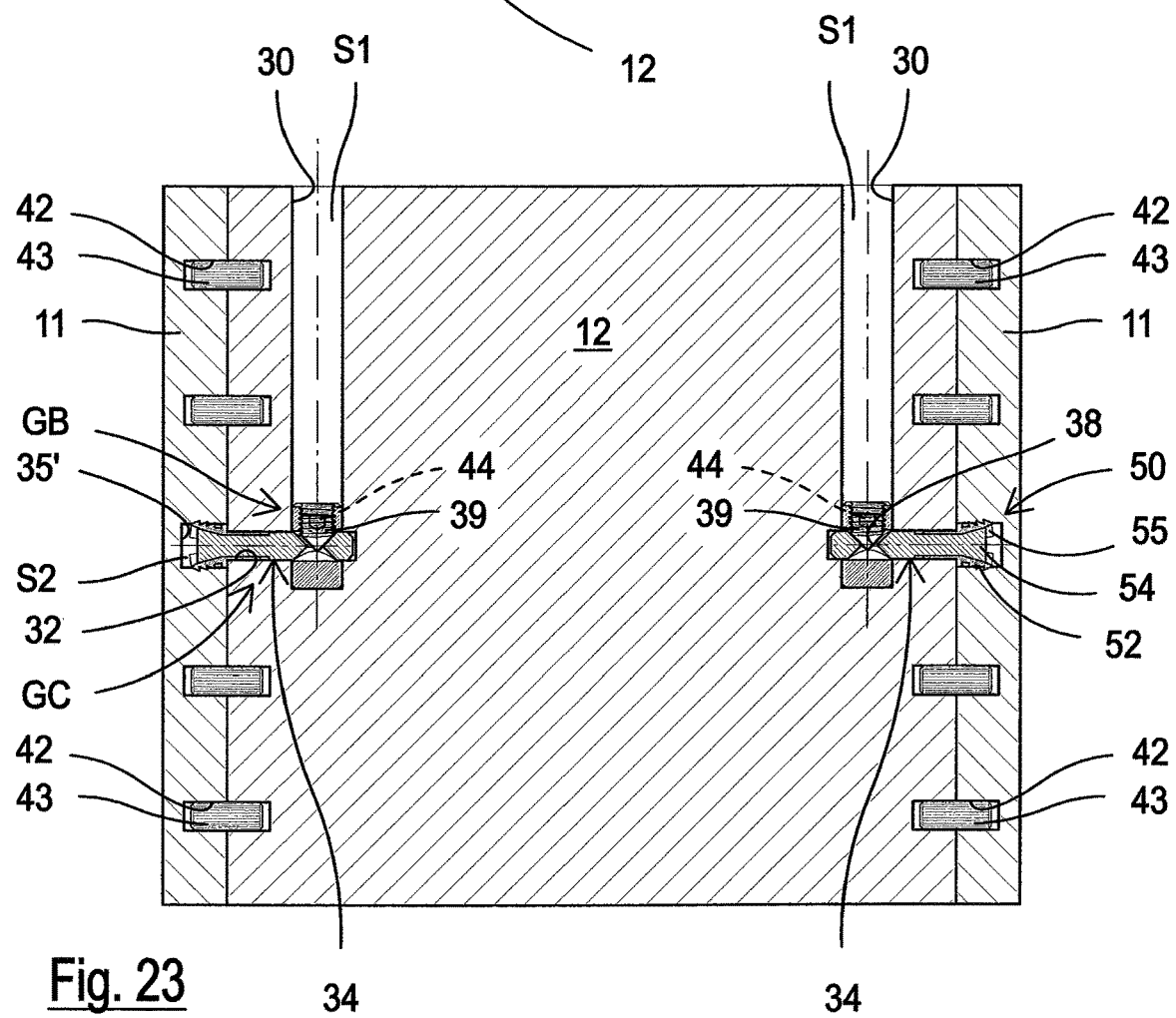
FIG. 23 is an enlarged sectional view of two joining devices of the fifth embodiment of the invention of FIG. 22.

FIGS. 20 and 21 show how an arrangement of parts of the embodiment described in FIGS. 18 and 19 can be doubled.

In this example, in fact, each base or shelf 12 provides two pairs of seats S1, S1', each in the form of a horizontal blind hole 30, 30'. Said holes 30, 30' have a different length, they are positioned parallel to each other and to each side of the base 12, arranged perpendicular to the rear part of the furniture when assembled.

Each of said seats S1, S1' also receives a blocking grub screw 39 which can be actuated by means of a common screwdriver introduced into the holes 30, 30' from the rear part of the furniture.

The base 12 also provides a pair of horizontal blind holes 32, 32' in an area close to the bottom end of each hole 30, 30', which intersect with the holes 30, 30' and which are perpendicular to the same. Also in this case, the arrangement is identical for both opposite sides of the base or shelf 12.

The holes 32, 32' receive a protruding part of the pins 34, 34', having a different length, whose end is positioned in a shoulder 11 of a respective seat S2 in the form of a horizontal blind hole 35. A bushing 36 internally threaded for receiving a threaded end 37 of each pin 34, 34' is block-inserted in said blind hole 35.

As for the previous examples, the pin 34, 34' provides a housing 38 in its protruding part, for the tip of the respective blocking grub screw 39.

The introduction of a screwdriver into the holes 30, 30' allows the blocking grub screw 39 to be actuated through the seat 44 to be positioned inside the housing 38 of the respective pin 34, 34', previously inserted in the respective hole 35.

It can be seen how this embodiment can also be actuated from the rear part of the furniture where the only visible holes are present, whereas the others are hidden during the coupling and blocking between the parts using the device of the present invention.

FIGS. 22 to 27 show a fifth embodiment of joining devices according to the present invention, also positioned between the two shoulders of the furniture and the base and top or shelf.

In this further embodiment, in which similar elements to those already described are indicated with the same reference numbers and, unless specifically indicated, exert the same function, a further variant of the joining device according to the present invention is illustrated.

It should be noted that the joining device comprises a blocking group GB defined in the example by a grub screw 39, arranged in a hole 30 of the panel or base 12. Said blocking group GB or grub screw 39 acts on a connection group GC defined by a pin 34 to be blocked.

The pin 34 is positioned and extends from a hole 32 formed in said panel 12, wherein the pin 34 connection group GC in one of its protruding free ends is in the form of a gripping means 50.

Said gripping means 50 can be positioned and is placed in a hole 35' situated laterally with respect to the other panel or shoulder 11 in coupling.

In the particular embodiment of the joining device illustrated, the gripping means 50, as already mentioned, extends from the pin 34 which provides a housing 38 for the tip of the blocking grub screw 39. The gripping means 50 is produced in the example in the form of an expansion pin positioned in said hole 35' of the other panel 11 in coupling.

In particular, the expansion pin 50 can provide outer toothings 52 for engagement with an internal wall of the hole 35'. In this example, said hole 35' is enlarged with respect to the holes 42 for the plugs or dowels 43. The expansion pin 50 provides an enlarged flange 53 which is abutted externally with respect to the hole 32 of the base 12 collaborating with the various functions.

The gripping means 50 or rather expansion pin provides an internal portion formed on a protruding free end of the pin 34 which terminates with an enlarged portion 54 which tapers and then widens at the free end and which is slidingly inserted in an internally hollow outer tubular element 55 having a complementary form externally provided with said teeth of the toothings 52.

Figure 26:
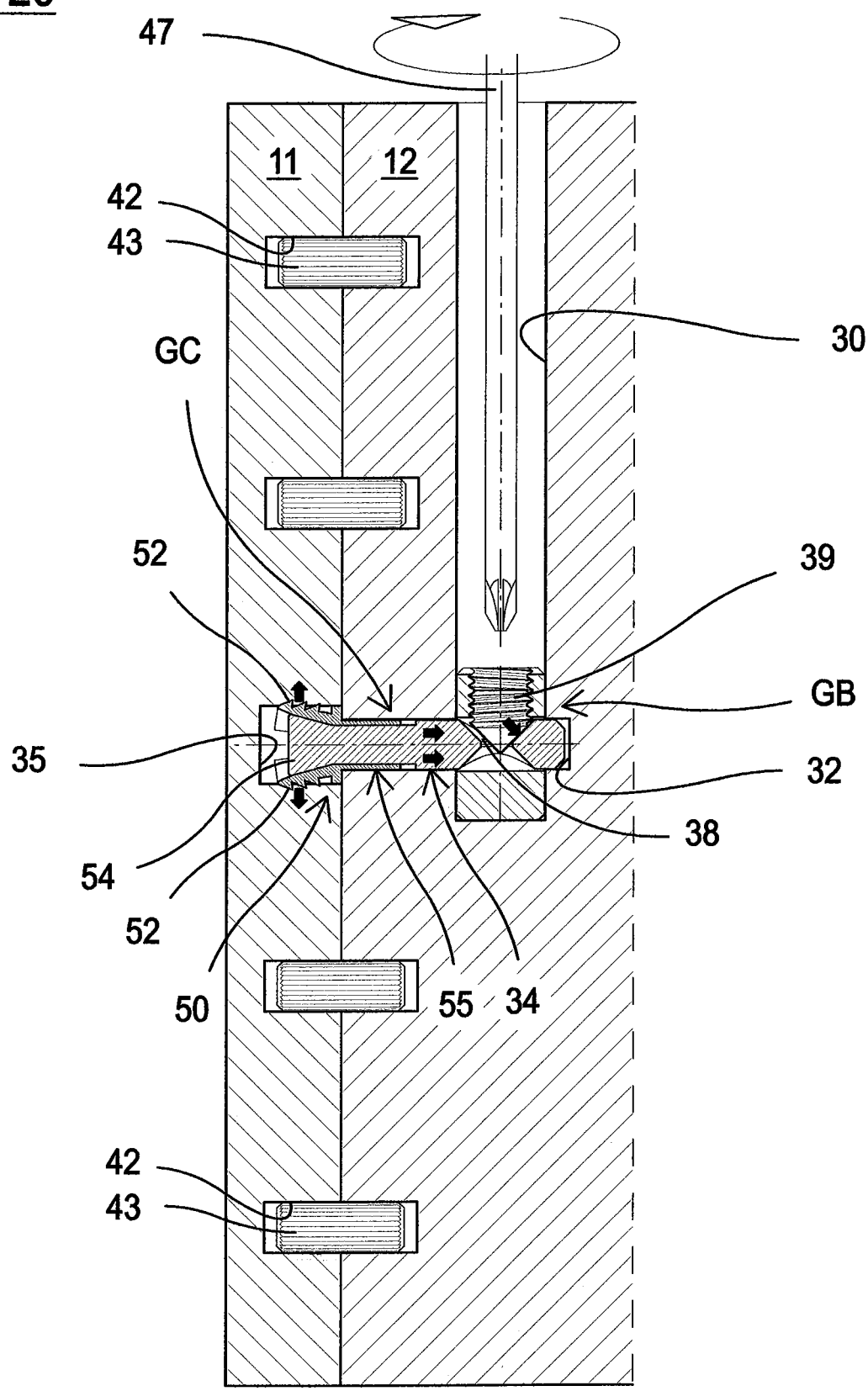
Figure 27:
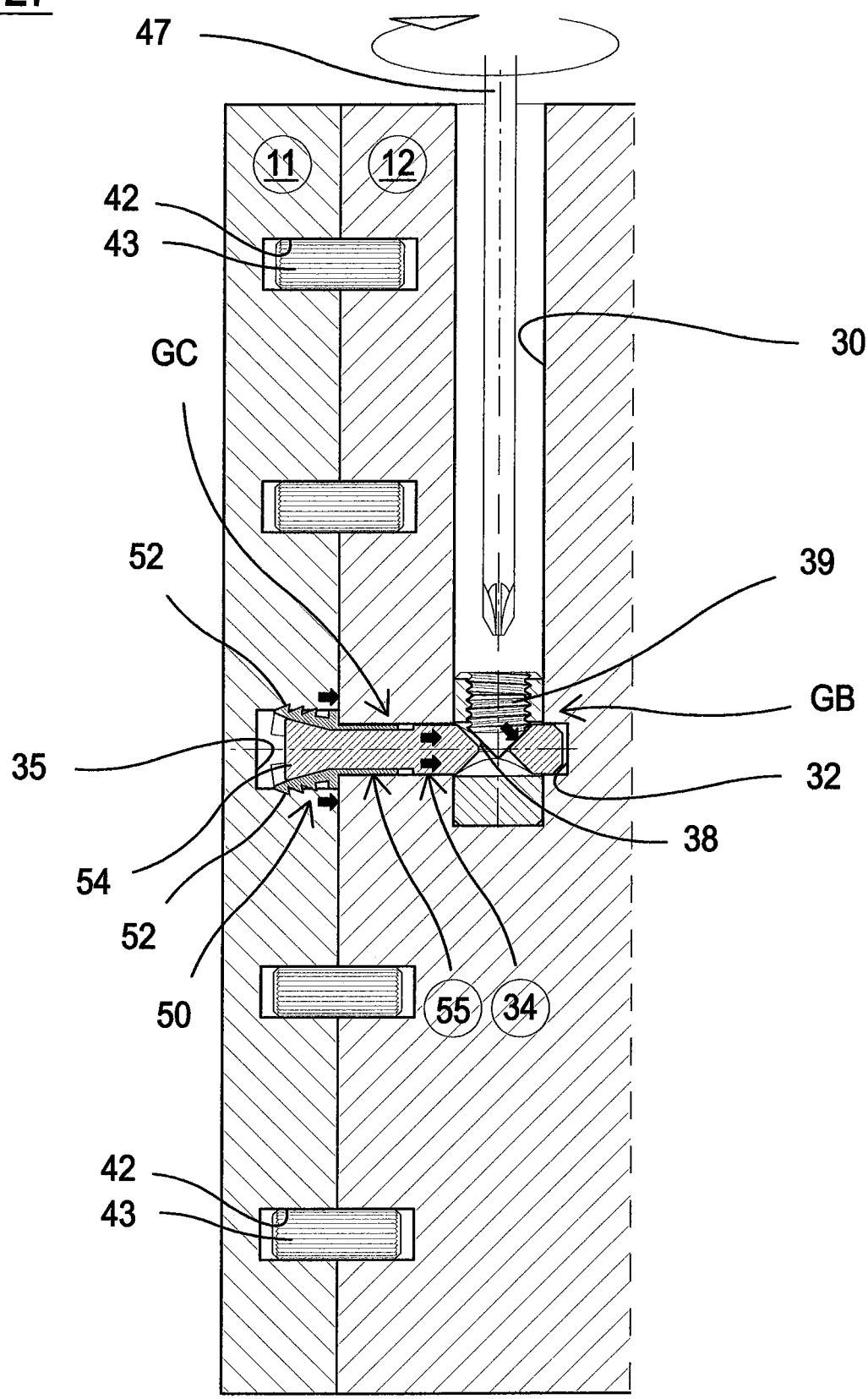

It should be pointed out that in the joining device according to the present invention, the gripping means 50 can be actuated by means of the grub screw 39 blocking group GB, as can be clearly seen in FIGS. 26 and 27.

Figure 24:
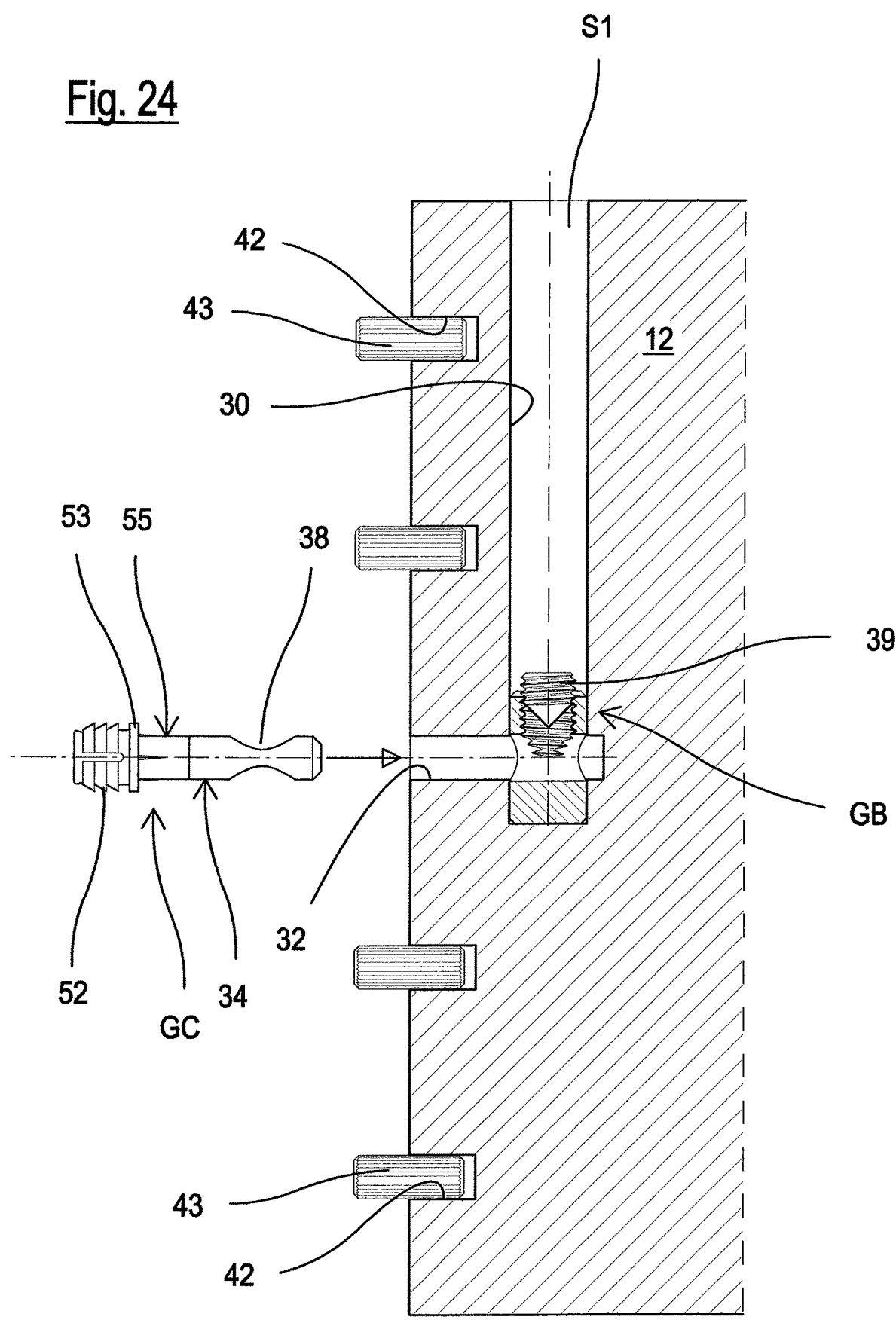
FIGS. 24, 25 and 26, 27 are sectional details of a part of FIG. 23 with a joining device and relative shoulder and shelf in an exploded view and respectively with a device assembled and actuated by means of a screwdriver in the two main blocking phases, once the parts have been juxtaposed and inserted in each other.

More specifically, FIG. 24 shows the joining device when exploded from the base or shelf 12. The gripping means or expansion pin 50 is outside the hole 32 of the base 12 in which it is to be positioned, as clearly shown in FIG. 25.

Figure 25:
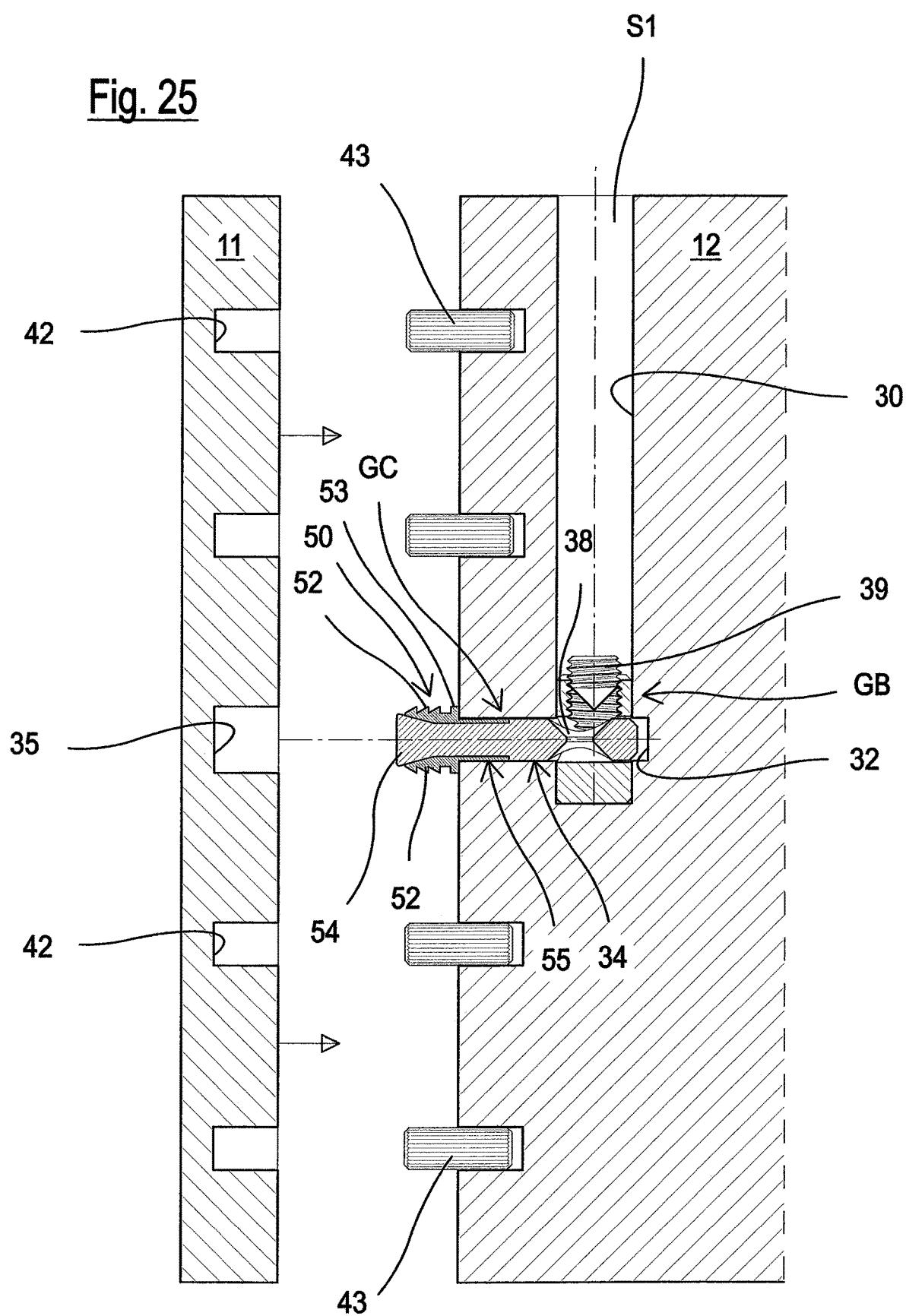

This FIG. 25 also shows how the shoulder 11 has been prepared, ready to be coupled according to the arrow shown therein.

FIGS. 26 and 27 show how a screwdriver 47 is introduced into the hole 30 to effect, in a first phase, the expansion and engagement of the toothing 52 against the internal surface of the hole 35'. By continuing with the screwing of the grub screw 39 against the housing 38, the flange 53 is abutted against the surface of the base 12, in a second phase.

In this way, the shoulder 11 and the base 12 are blocked, once the parts have been juxtaposed and the parts inserted in each other.

All the embodiments of the invention show how, first of all, the problem relating to the visibility of the various holes of the joining device and also the joining device itself, has been solved.

The creation of the actuation area on the rear part of the furniture represents an aesthetically valid aspect.

Furthermore, any possible caps positioned in the holes are absolutely not visible and do not interfere with what is resting on the base of the furniture which is free of any type of hole.

In this way, there are no obstacles on the base for the insertion of any object, eliminating any type of protrusion, even minimum, with respect to the upper surface of the base.

The formation of all the remaining holes on the parts that are coupled and therefore remain hidden, eliminates the slightest visibility on the part of an observer with respect to the visible holes of the known art, thus creating a high aesthetical value.

The forms of the structure for the embodiment of a joining device of the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A hidden joining device for parts of furniture and furnishing items, said parts including a first panel (11), and a second panel (12), which must be moved towards each other according to an approach direction (d) in order to bring an edge (B) of the first panel abutted in a tightening position against a surface (S) of the second panel, said hidden joining device comprising:
   a blocking group (GB) coupled to the first panel, said blocking group (GB) comprising an elongated bushing or tubular element (31) having:
      at least two traversal pass-through holes (40, 40'), and internally threaded sections in proximity to said traversal pass-through hole (40, 40'); and
   a connection group (GC) assembled on at the second panel (11, 12), said connection group (GC) comprising at least two pins (34, 34') configured to engage with said at least two traversal pass-through holes (40, 40'),
   wherein said blocking group (GB) is inserted inside a seat (S1, S1') that is contained in a thickness (SP) of the first panel (11, 12), and
   wherein said seat (S1, S1') extends from one of the edges (B1) of the first panel towards an interior thereof, forming a single visible hole (30) in an assembly of the first and second panels;
   wherein blocking grub screws (39, 39') engage with said internally threaded sections of said elongated bushing or tubular element (31) and said pins (34), and wherein one of said blocking grub screws is perforated so as to allow passage therethrough of a tool to engage with another of said blocking grub screws.

2. The hidden joining device according to claim 1, wherein said seat (S1, S1') has a substantially elongated configuration.

3. The hidden joining device according to claim 1 wherein said seat (S1, S1') extends from the edge (B11) towards the interior of said panel (11, 12) according to an axis (X) that is perpendicular to said approach direction (d).

4. The hidden joining device according to claim 1, wherein said seat is defined in a first hole (30, 30') of said first panel and said blocking group acts on said pin (34, 34'; 34"), said connection group being positioned on said second panel (11 or 12) and said pin extending extends from a second hole (35; 32, 33) situated laterally with respect to said second panel (11 or 12).

5. The hidden joining device according to claim 4, wherein said first hole (30) is disposed horizontally.

6. The hidden joining device according to claim 1 wherein said blocking group (GB) is adapted to be actuated from said first visible hole (30, 30') situated in rear position with respect to said first and second panels (11, 12) and wherein that said connection group (GC) is disposed to be coupled with said first panel (11) in a second hole (35) produced in said first panel (11).

7. The hidden joining device according to claim 1 wherein the elongate bushing or tubular element (31) intersects a second and a third blind hole (32, 33), perpendicular to said first hole (30) and spaced apart therefrom, the second and the third blind hole being also formed in the first panel (12, 11), each of said second and third holes (32, 33) being each configured for receiving a protruding part of said pin (34, 34', 34").

8. The hidden joining device according to claim 7, wherein said pin (34, 34') is positioned with one of its ends in the second panel (11, 12) in a horizontal blind hole (35) blocked in a bushing (36) housed therein that is internally threaded for receiving a threaded end (37) of said pin (34, 34').

9. The hidden joining device according to claim 7, wherein said pin (34, 34') has protruding parts with housings (38, 38') configured to receive tips of said blocking grub screws (39, 39').

10. The hidden joining device according to claim 9, wherein said two transversal pass-through holes (40, 40') are positioned to be aligned with said second and said third blind holes (32, 33), spaced apart and formed in the first panel (12, 11), when the bushing (31) is completely inserted in the first blind hole (30).

11. The hidden joining device according to claim 1, wherein a first one of the blocking grub screws (39) is centrally perforated so as to allow passage of a stem (46) of a rotation driving tool (45), whereas a second one of the grub screws (39') has a seat (44) for a tip of a screwdriver (47).

12. The hidden joining device according to claim 7, wherein said second and said third holes (32, 33) receive ends of an articulation element of a connection group (GC).

13. The hidden joining device according to claim 12, wherein said articulation element is composed of two pins (34") articulated by a central hinge (49) to the articulation element positioned at facing ends of said pins (34"), wherein said pins (34") are inserted in holes (32, 33) present on the first and said second panels to be connected.

14. The hidden joining device according to claim 1, wherein said pin (34) has a protruding free end in the form of a gripping member (50) configured be positioned in a hole (35) situated laterally in said second panel (11 or 12) in a coupling.

15. The hidden joining device according to claim 14, wherein said gripping member (50) comprises an expansion pin positioned in said hole (35) of said second panel (11 or 12).

16. The hidden joining device according to claim 15, wherein said expansion pin has outer toothings (52) for engagement with an internal wall of said hole (35).

17. The hidden joining device according to claim 16, wherein said gripping member (50) has an internal portion formed on said protruding free end of said pin (34) which terminates with an enlarged portion (54) which tapers and then widens at the free end and which is slidingly inserted in an internally hollow outer tubular element (55) having a complementary form externally provided with teeth of said outer toothings (52).

18. The hidden joining device according to claim 14, wherein said gripping member (50) is adapted to be actuated by means of said grub screw (39) blocking group (GB).

* * * * *